(12) United States Patent
Luo et al.

(10) Patent No.: US 10,953,365 B2
(45) Date of Patent: Mar. 23, 2021

(54) ACID GAS TREATMENT

(71) Applicant: Jiangnan Environmental Protection Group Inc., Grand Cayman (KY)

(72) Inventors: Jing Luo, Nanjing (CN); Lifang Qi, Nanjing (CN)

(73) Assignee: Jiangnan Environmental Protection Group Inc., Grand Cayman (KY)

( * ) Notice: Subject to any disclaimer, the term of this patent is extended or adjusted under 35 U.S.C. 154(b) by 0 days.

(21) Appl. No.: 16/740,917

(22) Filed: Jan. 13, 2020

(65) Prior Publication Data

US 2020/0147546 A1 May 14, 2020

Related U.S. Application Data

(62) Division of application No. 16/191,852, filed on Nov. 15, 2018, now abandoned.

(30) Foreign Application Priority Data

Jul. 20, 2018 (CN) .......................... 201810804898.6

(51) Int. Cl.
B01D 53/10 (2006.01)
B01D 53/50 (2006.01)
(Continued)

(52) U.S. Cl.
CPC ............. B01D 53/75 (2013.01); B01D 51/10 (2013.01); B01D 53/504 (2013.01);
(Continued)

(58) Field of Classification Search
CPC ...... B01D 53/75; B01D 51/10; B01D 53/504; B01D 53/523; B01D 53/73; B01D 53/78;
(Continued)

(56) References Cited

U.S. PATENT DOCUMENTS 2,810,627 A 10/1957 Johnstone et al.
3,752,877 A 8/1973 Beavon
(Continued)

FOREIGN PATENT DOCUMENTS

CN 1280032 A 1/2001
CN 201880482 U 6/2001
(Continued)

OTHER PUBLICATIONS

Office Action issued by the Japanese Intellectual Property Office in Japanese Application No. 2017-123088, dated Apr. 16, 2018.
(Continued)

*Primary Examiner* — Cabrena Holecek
(74) *Attorney, Agent, or Firm* — Weiss & Arons LLP

(57) ABSTRACT

Apparatus and methods for treating acid gas, which utilizes multi-stage absorption cycle of ammonia desulfurization to treat acid tail gas after pre-treatment of the acid gas, thereby achieving the purpose of efficient and low-cost treatment of acid tail gas. The parameters of the acid tail gas may be adjusted by a regulatory system such that the enthalpy value of the acid tail gas is in the range of 60-850 kJ/kg dry gas, for example, 80-680 kJ/kg dry gas or 100-450 kJ/kg dry gas, to meet the requirements of ammonia desulfurization, and achieve the synergy between the acid gas pre-treatment and ammonia desulfurization. Furthermore, hydrogen sulfide may be converted into sulfur/sulfuric acid plus ammonium sulfate at an adjustable ratio.

21 Claims, 2 Drawing Sheets

(51) Int. Cl.
  *B01D 53/52* (2006.01)
  *B01D 53/73* (2006.01)
  *B01D 53/75* (2006.01)
  *B01D 53/78* (2006.01)
  *C01B 17/04* (2006.01)
  *C01B 17/775* (2006.01)
  *C01C 1/24* (2006.01)
  *B01D 51/10* (2006.01)
  *B01D 53/86* (2006.01)
  *B01D 53/04* (2006.01)

(52) U.S. Cl.
  CPC ........... *B01D 53/523* (2013.01); *B01D 53/73* (2013.01); *B01D 53/78* (2013.01); *C01B 17/0404* (2013.01); *C01B 17/775* (2013.01); *C01C 1/24* (2013.01); *B01D 53/04* (2013.01); *B01D 53/8615* (2013.01); *B01D 2251/2062* (2013.01); *B01D 2253/102* (2013.01); *B01D 2257/302* (2013.01); *B01D 2257/304* (2013.01)

(58) Field of Classification Search
  CPC ............... B01D 53/04; B01D 53/8615; B01D 2251/2062; B01D 2253/102; B01D 2257/302; B01D 2257/304; B01D 53/1462–1481; B01D 2257/30–308; C01B 17/0404; C01B 17/775; C01C 1/24
  See application file for complete search history.

(56) References Cited

U.S. PATENT DOCUMENTS

| | | | |
|---|---|---|---|
| 3,957,951 A * | 5/1976 | Hokanson | C01Q 1/22 423/243.06 |
| 3,983,217 A | 9/1976 | Muraki et al. | |
| 4,250,160 A | 2/1981 | Eakman | |
| 4,294,590 A | 10/1981 | Linde et al. | |
| 4,324,776 A | 4/1982 | Kim | |
| 4,378,977 A | 4/1983 | Linde et al. | |
| 4,552,747 A | 11/1985 | Goar | |
| 4,690,807 A | 9/1987 | Saleem | |
| 5,019,361 A | 5/1991 | Hakka | |
| 5,106,607 A | 4/1992 | Chopin et al. | |
| 5,362,458 A | 11/1994 | Saleem et al. | |
| 5,632,967 A | 5/1997 | Nasato | |
| 6,063,352 A | 5/2000 | Risse et al. | |
| 6,066,304 A | 5/2000 | Freetly et al. | |
| 6,139,807 A | 10/2000 | Risse et al. | |
| 6,221,325 B1 | 4/2001 | Brown et al. | |
| 6,444,185 B1 | 9/2002 | Nougayrede et al. | |
| 6,508,998 B1 | 1/2003 | Nasato | |
| 6,569,398 B2 | 5/2003 | Fenderson | |
| 6,616,908 B2 | 9/2003 | Watson et al. | |
| 6,776,974 B1 | 8/2004 | Burmaster et al. | |
| 6,991,771 B2 | 1/2006 | Duncan et al. | |
| 7,351,392 B2 | 4/2008 | Chen et al. | |
| 7,635,408 B2 | 12/2009 | Mak et al. | |
| 7,648,692 B2 | 1/2010 | Chow et al. | |
| 7,754,471 B2 | 7/2010 | Chen et al. | |
| 7,879,135 B2 | 2/2011 | Ravikumar et al. | |
| 7,910,077 B2 | 3/2011 | Chow et al. | |
| 8,178,070 B2 | 5/2012 | Wong et al. | |
| 8,206,669 B2 | 6/2012 | Schaffer et al. | |
| 8,361,432 B2 | 1/2013 | Parekh et al. | |
| 8,444,943 B2 | 5/2013 | Lamar | |
| 8,545,793 B2 | 10/2013 | Thielert | |
| 8,871,176 B2 | 10/2014 | Liu et al. | |
| 9,370,745 B2 | 6/2016 | Xu et al. | |
| 2003/0175190 A1 | 9/2003 | Duncan et al. | |
| 2007/0248518 A1 | 10/2007 | Jung et al. | |
| 2009/0004070 A1 | 1/2009 | Chow et al. | |
| 2011/0195008 A1 | 8/2011 | Menzel et al. | |
| 2011/0243822 A1 | 10/2011 | Mortson | |
| 2015/0352489 A1* | 12/2015 | Luo | B01D 53/501 423/242.1 |
| 2019/0091625 A1* | 3/2019 | Luo | B01D 53/1406 |

FOREIGN PATENT DOCUMENTS

| | | |
|---|---|---|
| CN | 1377722 A | 11/2002 |
| CN | 1178735 C | 4/2003 |
| CN | 1408464 A | 4/2003 |
| CN | 1164480 C | 9/2004 |
| CN | 2640584 Y | 9/2004 |
| CN | 2640585 Y | 9/2004 |
| CN | 2668235 Y | 1/2005 |
| CN | 1617831 A | 5/2005 |
| CN | 2746971 Y | 12/2005 |
| CN | 2746972 Y | 12/2005 |
| CN | 2746973 Y | 12/2005 |
| CN | 2754711 Y | 2/2006 |
| CN | 1251965 C | 4/2006 |
| CN | 2772609 Y | 4/2006 |
| CN | 2778373 Y | 5/2006 |
| CN | 2799059 Y | 7/2006 |
| CN | 2799060 Y | 7/2006 |
| CN | 1283346 C | 11/2006 |
| CN | 1321723 C | 6/2007 |
| CN | 101085410 A | 12/2007 |
| CN | 201030298 Y | 3/2008 |
| CN | 201052456 Y | 4/2008 |
| CN | 100395006 C | 6/2008 |
| CN | 201109711 Y | 9/2008 |
| CN | 100428979 C | 10/2008 |
| CN | 201129965 Y | 10/2008 |
| CN | 201132102 Y | 10/2008 |
| CN | 101352642 A1 | 1/2009 |
| CN | 201179415 Y | 1/2009 |
| CN | 100460045 C | 2/2009 |
| CN | 100475313 C | 4/2009 |
| CN | 101422693 A | 5/2009 |
| CN | 201231130 Y | 5/2009 |
| CN | 101524620 | 9/2009 |
| CN | 201320447 Y | 10/2009 |
| CN | 201333376 Y | 10/2009 |
| CN | 101575103 A | 11/2009 |
| CN | 101585511 A | 11/2009 |
| CN | 201380037 Y | 1/2010 |
| CN | 201380038 Y | 1/2010 |
| CN | 201380039 Y | 1/2010 |
| CN | 201380040 Y | 1/2010 |
| CN | 100588608 C | 2/2010 |
| CN | 101642629 A | 2/2010 |
| CN | 201423237 Y | 3/2010 |
| CN | 101745303 A | 6/2010 |
| CN | 201492952 U | 6/2010 |
| CN | 101274750 B | 7/2010 |
| CN | 201529487 U | 7/2010 |
| CN | 201529488 U | 7/2010 |
| CN | 201537456 U | 8/2010 |
| CN | 101274196 B | 12/2010 |
| CN | 101182926 B | 1/2011 |
| CN | 103521060 A | 1/2011 |
| CN | 101519192 B | 2/2011 |
| CN | 101579600 B | 4/2011 |
| CN | 102000490 A | 4/2011 |
| CN | 102012034 A | 4/2011 |
| CN | 101456541 B | 5/2011 |
| CN | 101576261 B | 5/2011 |
| CN | 101579602 B | 5/2011 |
| CN | 102061206 A | 5/2011 |
| CN | 103822217 A | 5/2011 |
| CN | 101274204 B | 6/2011 |
| CN | 101670231 B | 8/2011 |
| CN | 201912884 U | 8/2011 |
| CN | 201912885 U | 8/2011 |
| CN | 201944861 U | 8/2011 |
| CN | 201949808 U | 8/2011 |
| CN | 102205202 A | 10/2011 |
| CN | 102380305 A | 3/2012 |
| CN | 102381685 A | 3/2012 |

(56) References Cited

FOREIGN PATENT DOCUMENTS

| | | |
|---|---|---|
| CN | 102381686 A | 3/2012 |
| CN | 102423597 A | 4/2012 |
| CN | 101791517 B | 5/2012 |
| CN | 102451604 A | 5/2012 |
| CN | 101456540 B | 7/2012 |
| CN | 101574614 B | 7/2012 |
| CN | 101637685 B | 7/2012 |
| CN | 102631827 A | 8/2012 |
| CN | 202460375 U | 10/2012 |
| CN | 202460420 U | 10/2012 |
| CN | 202460438 U | 10/2012 |
| CN | 101530727 B | 11/2012 |
| CN | 101955828 B | 11/2012 |
| CN | 102211762 B | 11/2012 |
| CN | 101972592 B | 12/2012 |
| CN | 102826572 A | 12/2012 |
| CN | 202538627 U | 12/2012 |
| CN | 101934191 B | 1/2013 |
| CN | 102049186 B | 1/2013 |
| CN | 202725003 U | 2/2013 |
| CN | 202751942 U | 2/2013 |
| CN | 202754802 U | 2/2013 |
| CN | 202829575 U | 3/2013 |
| CN | 101418246 B | 4/2013 |
| CN | 202912691 U | 5/2013 |
| CN | 202924730 U | 5/2013 |
| CN | 202953829 U | 5/2013 |
| CN | 102381687 B | 8/2013 |
| CN | 203159221 U | 8/2013 |
| CN | 203264545 U | 11/2013 |
| CN | 203291675 U | 11/2013 |
| CN | 102489140 B | 12/2013 |
| CN | 103418223 A | 12/2013 |
| CN | 203329558 U | 12/2013 |
| CN | 203612955 U | 5/2014 |
| CN | 103939918 A | 7/2014 |
| CN | 102942162 B | 8/2014 |
| CN | 203781842 U | 8/2014 |
| CN | 102910593 B | 9/2014 |
| CN | 102847431 B | 10/2014 |
| CN | 103204477 B | 10/2014 |
| CN | 103446859 B | 10/2014 |
| CN | 104138713 A | 11/2014 |
| CN | 103301732 B | 1/2015 |
| CN | 103041679 B | 2/2015 |
| CN | 103301736 B | 2/2015 |
| CN | 104368231 A | 2/2015 |
| CN | 204134465 U | 2/2015 |
| CN | 204151066 U | 2/2015 |
| CN | 102895870 B | 3/2015 |
| CN | 102923670 B | 3/2015 |
| CN | 204198421 U | 3/2015 |
| CN | 103223292 B | 4/2015 |
| CN | 104555939 A | 4/2015 |
| CN | 204233957 U | 4/2015 |
| CN | 103112831 B | 5/2015 |
| CN | 204352660 U | 5/2015 |
| CN | 103301705 B | 8/2015 |
| CN | 103482583 B | 9/2015 |
| CN | 104923046 A | 9/2015 |
| CN | 104927894 A | 9/2015 |
| CN | 104941423 A | 9/2015 |
| CN | 104946296 A | 9/2015 |
| CN | 103463949 B | 12/2015 |
| CN | 105110819 A | 12/2015 |
| CN | 105126573 A | 12/2015 |
| CN | 104353258 B | 1/2016 |
| CN | 104249995 B | 4/2016 |
| CN | 205235588 U | 5/2016 |
| CN | 205245200 U | 5/2016 |
| CN | 205252720 U | 5/2016 |
| CN | 205252721 U | 5/2016 |
| CN | 205252722 U | 5/2016 |
| CN | 205262780 U | 5/2016 |
| CN | 103822217 B | 6/2016 |
| CN | 105757688 A | 7/2016 |
| CN | 104555940 B | 8/2016 |
| CN | 105841168 A | 8/2016 |
| CN | 104524948 B | 9/2016 |
| CN | 205549846 U | 9/2016 |
| CN | 205562498 U | 9/2016 |
| CN | 103521060 B | 1/2017 |
| CN | 103939918 B | 1/2017 |
| CN | 104208992 B | 2/2017 |
| CN | 104258713 B | 2/2017 |
| CN | 104528659 B | 4/2017 |
| CN | 107213785 A | 9/2017 |
| CN | 107998844 A | 5/2018 |
| DE | 3733319 A1 | 9/1989 |
| EP | 165609 B1 | 6/1985 |
| EP | 212523 A2 | 3/1987 |
| EP | 2093062 A | 11/2016 |
| JP | S47-043737 | 11/1972 |
| TW | 497985 | 8/2002 |
| WO | WO200507505 A1 | 8/2005 |
| WO | WO2005113429 A1 | 12/2005 |
| WO | WO2006113935 A2 | 10/2006 |
| WO | WO2012152919 A1 | 11/2012 |

OTHER PUBLICATIONS

Office Action issued in U.S. Appl. No. 14/829,905 dated Nov. 16, 2015.
Office Action issued in U.S. Appl. No. 14/829,905 dated Feb. 29, 2016.
Office Action issued in U.S. Appl. No. 14/829,909 dated Apr. 15, 2016.
Office Action issued in U.S. Appl. No. 14/829,909 dated Dec. 14, 2016.
Office Action issued in U.S. Appl. No. 14/829,909 dated Feb. 14, 2017.
International Search Report issued for international Application No. PCT/CN2013/074657, dated Dec. 26, 2013.
International Search Report issued for International Application No. PCT/CN2014/087887, dated Jan. 14, 2015.
Supplementary European Search Report issued in European Application No. 13882863.7, dated Mar. 11, 2016.
"Introduction to FGD for China Shenhua Coal to Liquid(CTL) Project," Jiangnan Environmental Technology, Inc., 19$^{th}$ Annual Electric Power Conference and Exhibition, Apr. 13, 2017, Chicago, Illinois.
"Advantages & Application of Efficient Ammonia-Based Desulfurization Technology," Jiangnan Environmental Technology, Inc., 19$^{th}$ Annual Electric Power Conference and Exhibition, Apr. 13, 2017, Chicago, Illinois.
Wende Xiao and Zhiquan Wu, "Sulfur Dioxide Removal and Recovery," Chemical Industry Press (China), 143-145, May 2001.
Yana Yana, "Sulfur Dioxide Emission Reduction Technology and Flue Gas Desulfurization Project," Metallurgical Industry Press (China), 184-187, Jan. 2004.
Ke Zhang, "Industrial Chemistry," Commercial Press (China), 83-85, Jan. 1958.
Xianxi Ku, "Chemical Technology," Metallurgical Industry Press (China), 37-42, May 1995.
Zhoo Nan and Zengtai Zhao, "Nitrogen Fertilizer Industry," China Industry Press (China) 20-21, Mar. 1964.
Tianqi Liu and Xiaolin Huang, "Three Waste Treatment Engineering Technical Manual (part of Exhaust Gas)," Chemical Industry Press (China), 207-208, May 1999.
Shengli Cao, "Coal Chemical Product Technology," Metallurgical Industry Press (China), 43, Jun. 2003.
Communication from the Chilean Patent Office in connection with commonly-owned counterpart Chilean Patent Application No. 2019-001432.
Zhuo Nan and Zengtai Zhao, "Nitrogen Fertilizer Industry," China Industry Press (China), 20-21, Mar. 1964.
Google Patents English translation of CN1283346C.
Google Patents English translation of CN2640585Y.
Google Patents English translation of CN2772609Y.

(56) References Cited

OTHER PUBLICATIONS

Google Patents English translation of CN100428979C.
Google Patents English translation of CN201912885U.
Google Patents English translation of CN10322392A.
Communication from the Chilean Patent Office in connection with commonly-owned counterpart Chilean Patent Application No. 2019-001432, dated Sep. 28, 2020.
European Search Report received in connection with European Application No. EP 19163406, dated Sep. 26, 2019.
Communication from the GCC Patent Office in connection with commonly-owned counterpart GC Application No. GC 2019-37946, dated Sep. 3, 2020.
Examination Report received in connection with commonly-owned counterpart Indian Application No. 201934016832, dated Feb. 18, 2020.

* cited by examiner

ACID GAS TREATMENT

This application is a divisional of U.S. application Ser. No. 16/191,852, filed on Nov. 15, 2018, which claims priority under 35 U.S.C. § 119 of Chinese Patent Application No. 201810804898.6, filed on Jul. 20, 2018, both of which are hereby incorporated herein in their entireties.

TECHNICAL FIELD

The disclosure relates to removing acidic sulfide gas (such as hydrogen sulfide, sulfur dioxide, COS, $CS_2$, etc.) in production processes of petrochemical, natural gas chemical, coal chemical industries and other industries by utilizing an ammonia desulfurization process. The disclosure specifically relates to treating acid gas, wherein an ammonia desulfurization process is used to treat the acid tail gas, thereby achieving the purpose that net tail gas meets the discharge standards through multi-stage circulating absorption, in particular, wherein the enthalpy value of the acid tail gas is first adjusted by a regulatory system, and then the acid tail gas is fed into a subsequent ammonia desulfurization process. The disclosure further relates to a corresponding device for treating acid gas, which may be applied to the technical fields of petrochemical, natural gas chemical, coal chemical industries and the like.

BACKGROUND

Acid gas refers to the process gas that includes, among other things, sulfur-containing materials such as hydrogen sulfide, sulfur oxides, organic sulfur and the like, which is derived from petrochemical, natural gas chemical, coal chemical, shale oil chemical, and shale gas chemical industries and the like. The harmful components in the acid gas are primarily hydrogen sulfide, sulfur dioxide, COS, $CS_2$, etc. with a high concentration of $H_2S$ (generally, 70%-95% for petrochemical industry, 30%-80% for natural gas chemical industry, and 20%-50% for coal chemical industry), and need to be treated to meet a discharge standard.

There are various methods for treatment technologies of sulfide-containing acid gas, such as conventional Claus plus hydrogenation reduction absorption regeneration (low temperature SCOT (Shell's Shell Claus Off-gas Treating (multistep process for sulfur recovery from Claus tail gas))) technology, dry process for making sulfuric acid, incineration plus tail gas desulfurization technology, wet process for making sulfuric acid, conventional Claus plus SUPERCLAUS (registered; multi-stage process for sulfur recovery from $H_2S$-containing tail gas) and/or EUROCLAUS (registered; multi-stage process for sulfur recovery from $H_2S$-containing tail gas) technology, conventional Claus plus tail gas incineration plus tail gas desulfurization technology, conventional Claus plus catalytic oxidation, conventional Claus plus biological desulfurization, etc., wherein the most commonly used technology is the conventional Claus plus hydrogenation reduction absorption regeneration technology.

In the Claus sulfur recovery stage, 85%-99% of hydrogen sulfide is converted into sulfur, and less than 15% of the sulfide is reduced by hydrogenation, absorbed and regenerated to obtain $H_2S$ which is returned to the Claus sulfur recovery device.

However, after the above treatments, the acid gas is still difficult to meet environmental standards and cannot be directly discharged, and further treatment is required. Further treatment technologies include tail gas desulfurization by alkali method, tail gas bio-desulfurization, CANSOLV (registered; system for capturing $CO_2$ from low-pressure streams such as flue gas) and the like. With increasingly strict standards for sulfur discharged into the environment, a compulsory sulfur recovery rate may reach 99.9% or more, and the sulfur oxide concentration in the tail gas may be required to be controlled at 100 $mg/Nm^3$ or even below 50 $mg/Nm^3$.

However, in general, existing processes have large investment, high operating cost, and high emission concentrations of pollutants, or even have difficulty in meeting discharge standards, especially during the startup and shutdown periods.

The Chinese invention patent with Application No. CN 200910188118 discloses a high-concentration flue gas desulfurization method, which uses sodium-method desulfurization and simultaneously recovers the by-product sodium sulfite, wherein the flue gas is deoxidized before desulfurization. The concentration of sulfur dioxide in flue gas before treatment ranges between 10,000-100,000 $mg/m^3$, the oxygen content ranges between 2,000-10,000 $mg/m^3$, and the concentration of sulfur dioxide in the flue gas after treatment is less than 200 $mg/m^3$. Compared with the common sodium sulfite method, deoxidation step in this method requires conversion of part of sulfur dioxide into low-value low-concentration sulfuric acid as an efflux, and the recovery rate of sulfur dioxide in the flue gas is reduced. Furthermore, this method is difficult to deoxidize thoroughly, the purity of the product sodium sulfite is low, and this method has large investment and high operating cost.

The Chinese invention patent with Application No. CN 200580011908.X discloses a biological desulfurization technology, which is used for biological desulfurization of Claus tail gas to obtain desulfurized tail gas and sulfur product. The main process is that: tail gas is introduced into an absorber and contacted with a lean solvent to obtain desulfurized tail gas and a rich solvent; the rich solvent is introduced into a bioreactor device in which the dissolved hydrogen sulfide is bio-oxidized to obtain a sulfur product and a lean solvent. The hydrogen sulfide in the tail gas can be less than 10 ppm. This method has large investment, difficult operation, and waste liquid discharge, and it is difficult to keep the continuous and stable biological activity.

The Chinese invention patent with Application No. U.S. Pat. No. 5,019,361 illustrates the CANSOLV process flow as below: the concentration of sulfur dioxide is $7 \times 10^{-4}$-$5 \times 10^{-3}$, the mass concentration of the organic amine liquid is not less than 20%, the temperature of absorption liquid is 10° C.-50° C., sulfur dioxide absorbed per 1,000 g of absorption liquid is greater than 100 g, the desorption temperature is 70° C.-90° C., and 4 g-10 g of steam will be consumed per desorption of 1 g of sulfur dioxide. This method has large investment, waste acid discharge and high energy consumption.

The Chinese invention patent with Application No. CN 201210288895 discloses a method for treating Claus process tail gas, in which the Claus process tail gas containing sulfur dioxide, oxygen and water is continuously added into a reactor filled with a porous carbon desulfurizer; at a reaction temperature of 30° C.-150° C., sulfur dioxide and water in the tail gas undergo catalytic oxidation reaction on the surface of the porous carbon to form sulfuric acid, and the regeneration detergent is continuously introduced into the reactor at the same time. In this method, the desulfurization rate is up to 93%, and the final tail gas discharge cannot meet the high environmental protection requirements, and the by-product low-concentration sulfuric acid is difficult to use. The multi-stage Claus process tail gas still fails to meet the discharge requirements.

Countries around the world discharge sulfur dioxide to different degrees. China's sulfur dioxide emissions are huge and have a great impact on the environment and society. The total amount of sulfur dioxide emissions in 2014 was 19.74 million tons, and the total amount of sulfur dioxide emissions in 2015 was 18.591 million tons, ranking first in the world, which caused a huge economic loss and seriously affected China's ecological environment and people's health.

In view of the shortcomings of the above technologies and the reality of sulfur dioxide emission load in China, various tail gas desulfurization technologies are emerging. At present, there are hundreds of mature desulfurization technologies, among which the wet desulfurization process is the most widely used, accounting for about 85% of the world's total installed capacity of desulfurization. Common wet flue gas desulfurization technologies include limestone-gypsum method, double alkali-method, sodium carbonate-method, ammonia-method, magnesium oxide-method, and the like. Ammonia desulfurization is a wet desulfurization process using ammonia as an absorbent, this method can produce ammonium sulfate fertilizer using $SO_2$, and is a green flue gas management scheme with low energy consumption, high additional value and the implementation of recycling utilization of resources. Since a large amount of available ammonia water is generated in the production process of the chemical industry, the use of ammonia desulfurization may be desirable for the tail gas in the chemical industry.

The ammonia desulfurization process is mainly composed of three processes: absorption, oxidation and concentration (crystallization). Firstly, sulfur dioxide is absorbed with ammonium sulfite to obtain a mixed solution of ammonium sulfite and ammonium hydrogen sulfite, and then neutralization by adding ammonia is performed to obtain ammonium sulfite again:

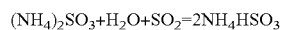
$$(NH_4)_2SO_3+H_2O+SO_2=2NH_4HSO_3$$

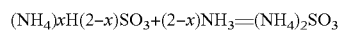
$$(NH_4)xH(2-x)SO_3+(2-x)NH_3=(NH_4)_2SO_3$$

Oxidized air is introduced into the solution to oxidize ammonium (hydrogen) sulfite to obtain ammonium (hydrogen) sulfate:

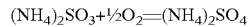
$$(NH_4)_2SO_3+\tfrac{1}{2}O_2=(NH_4)_2SO_4$$

The circulating absorption liquid containing ammonium sulfate is subjected to concentration, crystallization, solid-liquid separation and drying to obtain the final product, ammonium sulfate.

The Chinese invention patent with Application No. CN 201310130225.4 discloses an ammonia-method flue gas management apparatus and methods for acid tail gas, specifically comprising the following steps: 1) controlling the concentration of sulfur dioxide in the tail gas to be introduced into an absorption tower at ≤30000 mg/Nm³; 2) process water or ammonium sulfate solution is provided in the inlet flue pipe of the absorption tower or within the absorption tower for spraying to lower the temperature; 3) an oxidation section is provided in the absorption tower, and an oxidation distributor is provided in the oxidation section to realize oxidation of the desulfurization absorption liquid; 4) an absorption section is provided in the absorption tower, and an absorption liquid distributor is used to achieve desulfurization spray absorption by the ammonia-containing absorption liquid in the absorption section; the ammonia-containing absorption liquid is supplemented through an ammonia storage tank; 5) the upper part of the absorption section in the absorption tower is equipped with a water washing layer, which washes the absorption liquid in the tail gas to reduce the escape of the absorption liquid; 6) the upper part of the water washing layer in the absorption tower is equipped with a defogger to control the content of fog drops in the purified tail gas; in the coal chemical industry, the use of integrated desulfurization technology of Claus sulfur recovery plus ammonia desulfurization can reduce the investment cost of post-treatment, and the flow is simpler, and the process is mainly applied to acid gas treatment in the coal chemical industry, wherein the concentration of sulfur dioxide in the tail gas to be introduced into the absorption tower needs to be controlled at ≤30,000 mg/Nm³, and the requirements for other parameters of the tail gas such as enthalpy value and impurity content are not specified.

The Chinese invention patent with Application No. CN 201410006886.0 discloses a method for efficiently removing acidic sulfide gas using ammonia desulfurization technology, comprising the following steps: 1) pre-treatment: sulfide in acid gas is subjected to the pre-treatment method such as sulfur recovery, sulfuric acid production and/or incineration, and thus the remaining sulfur in the acid gas is converted into sulfur oxides to obtain acid tail gas containing sulfur oxides; the acid gas is derived from petrochemical, natural gas chemical, coal chemical industries and the like; 2) ammonia absorption of sulfur oxide: the acid tail gas containing sulfur oxides is introduced into an ammonia absorption device, and the sulfur oxides are absorbed by a circulating absorption liquid; 3) ammonium sulfate post-treatment: the saturated or nearly saturated absorption liquid which fully absorbs sulfur oxides is subjected to concentration, crystallization, solid-liquid separation, and drying to obtain a solid ammonium sulfate product. Sulfur oxides (sulfur dioxide, sulfur trioxide, and hydrates thereof) are removed from the acid tail gas; furthermore, sulfuric acid, sulfur and ammonium sulfate by-products are generated, and clean gas is discharged meeting the standard. The components, density, circulation amount or other parameters of the absorption liquid are adjusted according to different sulfur oxide concentrations and sulfur oxide absorption amounts in the acid tail gas. When the concentration of sulfur oxide in the acid gas is lower than 30,000 mg/Nm³, the acid gas is directly introduced into the ammonia absorption device without pre-treatment. The enthalpy value and the impurity content of the acid tail gas after the pre-treatment are not specified in this process, as well as the treatment measures after the impurities enter the ammonia desulfurization system.

The Chinese patent applications with Application Nos. CN 201611185413.7, CN 201611185413.7, and CN 201810062243.6 have also attempted to improve the treatment of acid tail gas by ammonia desulfurization, respectively, but these improvement measures are still not ideal. Moreover, the control over the enthalpy value of the acid tail gas has not been noted in these publications either.

Therefore, it is desirable to determine more suitable acid tail gas parameters and further improve the desulfurization method. This may reduce the investment and operating cost of the ammonia desulfurization device, may achieve long-period stable operation, may achieve synergistic control of acid gas pre-treatment and ammonia desulfurization of tail gas, may improve ammonia recovery rate, may control the production of aerosol, and may improve the product quality.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

LIST OF REFERENCE SIGNS

Figure 1:
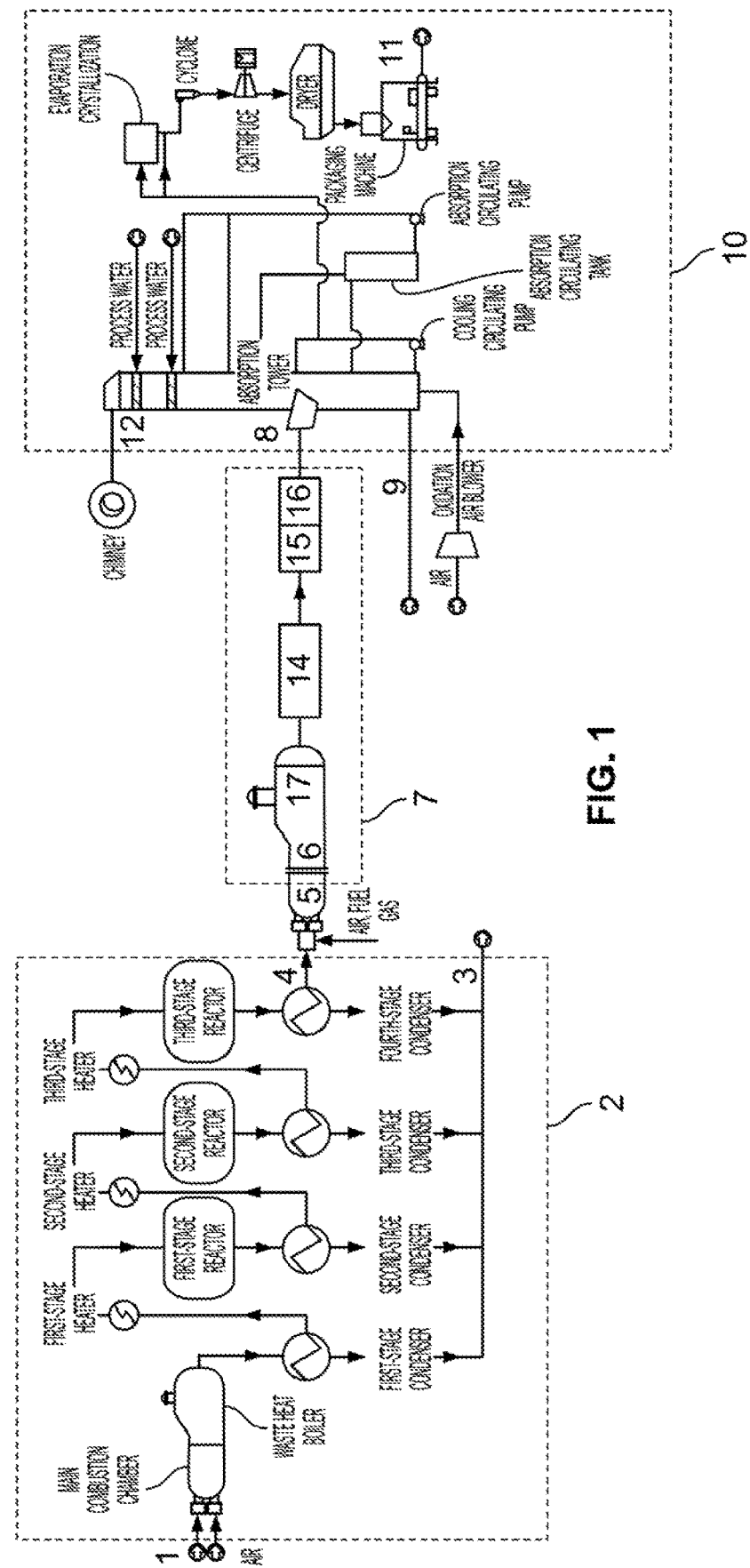
FIG. 1 shows illustrative apparatus of Example 1 in accordance with principles of the invention.
Figure 2:
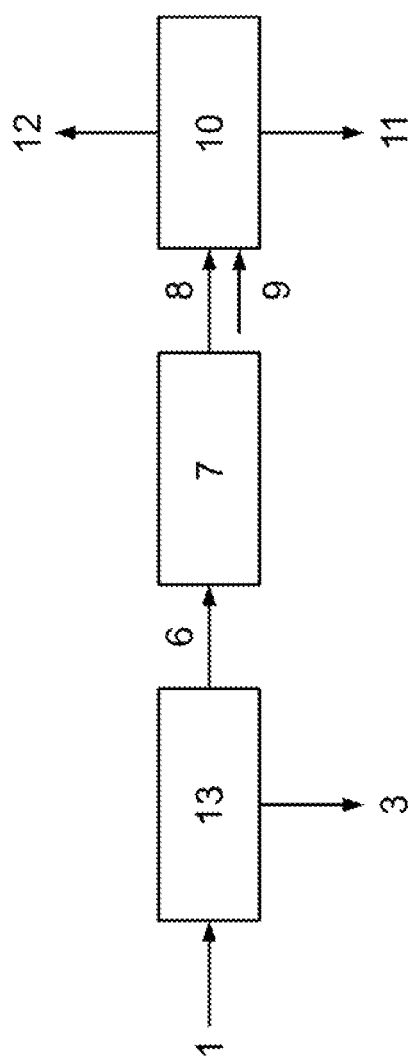
FIG. 2 shows illustrative apparatus of Example 2 in accordance with principles of the invention.

1. Acid gas
2. Sulfur recovery system
3. Sulfur/sulfuric acid
4. Sulfur-recovered tail gas
5. Incineration system
6. Acid tail gas
7. Regulatory system
8. Adjusted tail gas
9. Ammonia
10. Ammonia desulfurization system
11. Ammonium sulfate
12. Net tail gas
13. Sulfuric acid production system
14. Cooling apparatus
15. Dehumidifying apparatus
16. Sulfur removal device
17. Dust removal/impurity removal apparatus.

DETAILED DESCRIPTION

Definitions

"Ammonia recovery" means that fraction or percentage of ammonia added to a gas cleaning process that is subsequently captured and extracted from the process.

"Dust" means a particulate material fine enough to waft along gaseous flows, when handled, processed, or contacted. It includes but is not limited to aerosols, including solid aerosol particles and liquid aerosol particles, soot, charcoal, non-combusted coal, fine minerals, sand, gravel, salts, and any combination thereof.

"Oxidation rate" means the percentage, calculated by mol percent, of a given material that has been converted into an identified more-oxidized species of the material. For example, in a mixture containing ammonia bearing species and sulfur oxides, if X mol % of the mixture is ammonium sulfate, Y mol % is ammonium sulfite, and Z mol % is some other ammonia, sulfur, and/or oxygen containing species with an oxidation potential greater than ammonium sulfate, because ammonium sulfate is the identified most-oxidized species, the oxidation rate of the mixture would be X mol %.

"Sulfur oxides or SO" means a chemical species containing sulfur and oxygen. It includes compounds such as sulfur monoxide (SO), sulfur dioxide ($SO_2$), sulfur trioxide ($SO_3$), higher sulfur oxides ($SO_3$ and $SO_4$ and polymeric condensates of them), disulfur monoxide ($S_2O$), disulfur dioxide ($S_2O_2$), and lower sulfur oxides ($S_7O_2$, $S_6O_2$, and $S_nO_x$, where n and x are any possible stoichiometric numerical values).

In the event that the above definitions or a description stated elsewhere in this application is inconsistent with a meaning (explicit or implicit) that is commonly used, set forth in a dictionary, or stated in a source incorporated by reference into this application, the application and the claim terms in particular are understood to be construed according to the definition or description in this application, and not according to the common definition, dictionary definition, or the definition that was incorporated by reference. In the event that a claim term can only be understood if it is construed by a dictionary, a definition set forth in the Kirk-Othmer Encyclopedia of Chemical Technology, 5th Edition, 2005, (John Wiley & Sons, Inc.) shall control, if provided therein.

The disclosure provides apparatus and methods for treating acid gas with respect to none, some, or all of the following problems of the prior art in using ammonia desulfurization to treat acid tail gas: inability of achieving long-period stable operation of the device, poor product quality, and difficulty in headstream-controlling ammonia escape and the production of aerosol.

The apparatus and methods for treating acid gas may include the use of an ammonia desulfurization process to treat acid tail gas, and may achieve the discharge of net tail gas meeting the standard through multi-stage circulating absorption and efficient acid tail gas treatment with low cost. Here, the multi-stage circulating absorption of ammonia desulfurization may include one or more of a cooling cycle, an $SO_2$ absorption cycle, and a water-washing cycle.

It may be advantageous to adjust the enthalpy values of the acid tail gases obtained as described above by a regulatory system at first, and then feed the acid tail gases into a subsequent ammonia desulfurization process.

The enthalpy value of acid tail gas has an effect on the stable standardized operation of the desulfurization device: when the enthalpy value is high and the absorption temperature is high, ammonia escape may be significant, and thus absorption efficiency cannot be guaranteed; whereas, when the enthalpy value is low and the absorption temperature is low, oxidation rate of circulating absorption liquid may be low and thus the post-treatment system cannot be operated stably, moreover, since the sulfur-recovered tail gas may be incompletely incinerated in an incineration system, hydrogen sulfide tends to be converted into sulfur when incinerated at a lower temperature, and hydrogen sulfide, elementary sulfur and organic matters in turn may affect the oxidation of ammonium sulfite and the crystallization of ammonium sulfate, causing the poor product quality. If it is desirable to incinerate virtually all of the hydrogen sulfide, organic matters and elementary sulfur in the acid gas or sulfur-recovered tail gas through the incineration system, the incineration temperature may need to be raised to 1,300° C. or higher, the coefficient of excess air may need to be raised to 1.8, and the residence time may need to be raised to 7 s. However, this may increase the investment and operating cost of the incineration system and may consume a large amount of fuel gas; moreover, the incinerated flue gas may contain a high concentration of nitrogen oxides, the denitrification investment may be large with high operating cost, and the nitrogen oxide content of the final effluent gas may not easily meet the standard.

The enthalpy value of the acid tail gas should be appropriately controlled within the range of 60-850 kJ/kg dry gas, for example, 80-680 kJ/kg dry gas or 100-450 kJ/kg dry gas, before entering the process of ammonia desulfurization.

The regulatory system may include a temperature adjustment unit and/or a humidity adjustment unit or both of a temperature adjustment unit and a humidity adjustment unit. The enthalpy value of acid tail gas may be controlled by measuring the temperature and humidity of the acid tail gas which will enter the process of ammonia desulfurization, and by adjusting the temperature and humidity of the tail gas with the regulatory system.

An illustrative formula of the enthalpy value of tail gas is $H=(1.01+1.88b)*t+2490b$, wherein t is temperature in ° C., and b is water vapor content in dry gas in kg/kg dry gas.

Those skilled in the art will appreciate that, depending on different temperatures and humidities of the acid tail gas itself to be treated in the regulatory system, the temperature adjustment unit may accordingly comprise a heating or cooling apparatus, for example, a heater or cooler or other temperature control apparatus, while the humidity adjustment unit may accordingly comprise a humidifying or dehumidifying apparatus, such as an apparatus that can perform nitrogen or carbon dioxide gas distribution or add water vapor. Suitable temperature regulating apparatus and humidity regulating apparatus themselves are well known to those skilled in the art.

The regulatory system further may include one or more of a sulfur removal unit, a dust removal unit, and an impurity removal unit. Thus, the total dust content of the acid tail gas may be adjusted by the regulatory system, and the total acid dust content of the acid tail gas after adjustment may be ≤200 mg/Nm$^3$, for example, ≤50 mg/Nm$^3$.

The impurity content of the acid tail gas can be adjusted by the regulatory system, and the organic matter content of the acid tail gas after adjustment may be ≤30 ppm, for example ≤10 ppm, and/or the elementary sulfur and hydrogen sulfide content may be ≤30 ppm, for example ≤10 ppm.

The circulating absorption liquid of ammonia desulfurization may be subjected to a purification treatment such that the suspended matter content in the circulating absorption liquid may be ≤200 mg/L and/or the oil content may be ≤100 mg/L.

There are no special restrictions on the source of acid tail gas applicable to the apparatus and methods, as long as they are commonly used in the petrochemical, natural gas chemical, coal chemical industries and the like. Here, the acid tail gas may include, illustratively, the tail gas obtained after treating the petrochemical, natural gas chemical, and coal chemical acid gas with a process such as sulfur recovery plus incineration, sulfuric acid production, and incineration; or the acid tail gas may include, illustratively, catalytic cracking regeneration flue gas.

The sulfur recovery may include a sulfur recovery process, such as a 1 to 3-stage Claus sulfur recovery process, a SUPERCLAUS sulfur recovery process, an EUROCLAUS sulfur recovery process, a liquid-phase catalytic oxidation sulfur recovery process or a biological sulfur recovery process; and the sulfuric acid production process may be performed with a wet sulfuric acid production process or a dry sulfuric acid production process.

The molar ratio of $H_2S/SO_2$ in the sulfur-recovered tail gas may be controlled at 1.2-3, for example, 1.5-2.5.

In the sulfur recovery plus incineration process and the incineration process, the incineration temperature may be 600° C.-1,300° C., for example, 650° C.-950° C., the residence time may be 1-6 s, for example, 1.5-4 s, the oxygen content of the acid tail gas may be 2%-5%, for example, 3%-4%, and sulfur oxide content of the acid tail gas may be 2,000-150,000 mg/Nm$^3$, for example 5,000-55,000 mg/Nm$^3$.

The methods may include the process steps:

1) acid gas is treated by sulfur recovery plus incineration or sulfuric acid production or incineration, or directly by catalytic cracking catalyst regeneration process to obtain acid tail gas;

2) the acid tail gas is fed into the regulatory system to adjust the enthalpy value of the tail gas to be within the range of 60-850 kJ/kg dry gas, for example, 80-680 kJ/kg dry gas or 100-450 kJ/kg dry gas;

3) the acid tail gas which meets the enthalpy value requirement is fed into the ammonia desulfurization process for treatment, to achieve the purpose that net tail gas meets the discharge standard through multi-stage circulating absorption.

The acid tail gas obtained in step 2) may be further treated in the regulatory system such that the total dust content is ≤200 mg/Nm$^3$ and/or the organic matter content is ≤30 ppm and/or the elementary sulfur content is ≤30 ppm before it is fed into the ammonia desulfurization process.

The apparatus may include a device for treating acid gas, including an acid gas pre-treatment system and an ammonia desulfurization system.

The acid gas pre-treatment system may include one or more of a sulfur recovery system plus incineration system, a sulfuric acid production system, an incineration system, and a catalytic cracking catalyst regeneration system. The ammonia desulfurization system may be a conventional ammonia desulfurization device, and its structure may be known in the art, for example, reference may be made to CN 201710379460.3, CN 201810057884.2 for which the applicant has applied. CN 201710379460.3, CN 201810057884.2 are hereby incorporated herein by reference in their entireties.

The sulfur recovery system may include one or more of a 1 to 3-stage Claus sulfur recovery system, a SUPERCLAUS sulfur recovery system, an EUROCLAUS sulfur recovery system, a liquid-phase catalytic oxidation sulfur recovery system and biological sulfur recovery system.

The apparatus may include a regulatory system comprising a temperature regulating apparatus and/or a humidity regulating apparatus, or both a temperature regulating apparatus and a humidity regulating apparatus. The regulatory system may include one or more of a sulfur removal device, a dust removal apparatus, and an impurity removal apparatus.

The acid gas pre-treatment system, the regulatory system, and the ammonia desulfurization system may be connected successively. The acid gas pre-treatment system may include a sulfur recovery system plus incineration system. The regulatory system may include one or more of a temperature regulating apparatus, a humidity regulating apparatus, and an impurity removal apparatus that can be connected to each other successively in any order, or one or more of an impurity removal apparatus, a temperature regulating apparatus, a humidity regulating apparatus and an impurity removal apparatus that can be connected to each other successively in any order.

The apparatus may include an absorption liquid treatment system that may include one or more of a concentration apparatus, a solid-liquid separation apparatus, and a drying apparatus.

The absorption liquid treatment system may include one or more of a solution purification apparatus and an evaporation crystallization apparatus. The solution purification apparatus may include one or more of an oil removal apparatus and a suspended matter removal apparatus. The suspended matter removal apparatus may be configured to form a circulating absorption liquid with a suspended matter content of ≤200 mg/L, 20-100 mg/L, or 30-50 mg/L.

The oil removal apparatus may be configured to form a circulating absorption liquid with an oil content of ≤100 mg/L, for example 10-80 mg/L or 20-30 mg/L. The oil removal apparatus may include one or more of an air flotation apparatus, an adsorption apparatus or a precision filtration apparatus, or a combination thereof.

The oil removal apparatus may be connected to the incineration system.

The acid gas derived from petrochemical industry may be subjected to sulfur recovery plus incineration (pre-treatment) to obtain an acid tail gas, and then the enthalpy value of the acid tail gas may be adjusted with a regulatory system before it is fed into the ammonia desulfurization process. Here, the multi-stage circulating absorption of ammonia desulfurization may include a 1-stage cooling cycle, a 2-stage $SO_2$ absorption cycle, and a 1-stage water-washing cycle.

The regulatory system may include one or more of a temperature regulating unit, a humidity regulating unit and a sulfur removal unit that are connected successively. The enthalpy value of the acid tail gas may be first adjusted to 560-720 kJ/kg dry gas through a cooling apparatus, and then the low-temperature low-enthalpy nitrogen gas may be supplemented through a dehumidifying apparatus to further adjust the acid tail gas's enthalpy value to 440-530 kJ/kg dry gas. Then, the elementary sulfur and hydrogen sulfide content of the tail gas may be regulated and controlled to 4-7.5 ppm through an adsorption sulfur-removal apparatus.

The hydrogen sulfide content of the acid gas may be, for example, about 90%, the rest being nitrogen, carbon dioxide, and the sulfur recovery system for treating the acid gas may include an air-method 3-stage Claus sulfur recovery process. The molar ratio of $H_2S/SO_2$ in the sulfur-recovered tail gas may be controlled at 1.7-2.8, the incineration temperature of the incineration system may be 850° C.-950° C., the residence time may be 2-4 s, the oxygen content of the acid tail gas may be about 3%, and the sulfur oxide content in the incinerated tail gas may be about 12,000-15,000 $mg/Nm^3$.

For an illustrative flow rate of an acid gas of 46,000 $Nm^3/h$, the sulfur recovery rate may be 96%, the annual operating time may be 8,400 h, and 477,000 tons of sulfur per year and 80,500 tons of ammonium sulfate per year may be obtained after the treatment.

If the regulatory system is not used to control the organic matter content of the acid tail gas, the circulating absorption liquid of ammonia desulfurization may be subjected to the treatment of oil removal to render the oil content of the circulating absorption liquid ≤50 mg/L.

An illustrative acid gas treatment apparatus may include one or more of an acid gas pre-treatment system (sulfur recovery system plus incineration system), a regulatory system, and an ammonia desulfurization system.

The sulfur recovery system may include a thermal reaction plus 3-stage Claus catalytic reaction apparatus, and the Claus catalytic recoverer may be a recoverer that is not charged with a hydrolysis catalyst.

The regulatory system may include one or more of a temperature regulating apparatus, a humidity regulating apparatus and a sulfur removal device that are connected successively.

The sulfur recovery system, incineration system, regulatory system and ammonia desulfurization system for acid gas may be connected successively. The temperature regulating apparatus may be a two-stage waste heat recovery apparatus, the by-product of first-stage waste heat recovery may be saturated steam, and the second-stage waste heat recovery may preheat boiler feed water; and the humidity regulating apparatus may include a nitrogen gas distribution apparatus.

The apparatus make include an absorption liquid treatment system, which may include one or more of a concentration apparatus, a solid-liquid separation apparatus, and a drying apparatus.

The absorption liquid treatment system may include a solution purification apparatus. The solution purification apparatus may include an oil removal apparatus, which may be configured to form a circulating absorption liquid with an oil content of ≤50 mg/L. The oil removal apparatus may include an air flotation apparatus plus precision filtration apparatus.

The oil removal apparatus may be connected to the incineration system, and the waste oil may be completely incinerated into water, carbon dioxide and sulfur dioxide in the incineration system.

With regard to the apparatus and methods, reference can be made to the authorized series patents of ammonia desulfurization, such as CN 200510040801.1, CN 03158258.3, CN 201010275966.8, CN 200510040800.7, CN 03158257.5 and the like, and CN 201710379460.3, CN 201710379458.6, CN 201710154157.3, CN 201710800599.0, CN 201710865004.X, and CN 201810329999.2 under examination.

Compared with prior acid gas treatment process, by specifying the acid tail gas control parameters, using the pre-treatment plus adjustment plus ammonia desulfurization process to treat the acid gas, especially by controlling the enthalpy value of the acid tail gas, the apparatus and methods may reduce the investment and operating cost of the ammonia desulfurization system, may achieve long-period stable operation, may achieve synergistic control of acid gas pre-treatment and ammonia desulfurization of acid tail gas, may improve ammonia recovery rate, may control the production of aerosol, and may improve the product quality.

Apparatus and methods for treating acid gas are provided. The apparatus may include, and the methods may involve an acid gas pre-treatment system; and, in fluid communication with the acid gas pre-treatment system, an ammonia desulfurization system.

The pretreatment system may include one or more of a sulfur recovery system plus incineration system, a sulfuric acid production system; and a catalytic cracking catalyst regeneration system. The sulfur recovery system may include a Claus sulfur recovery system. The Claus sulfur recovery system may be a one-stage Claus sulfur recovery system. The Claus sulfur recovery system may be a two-stage Claus sulfur recovery system. The Claus sulfur recovery system may be a three-stage Claus sulfur recovery system.

The sulfur recovery system may include a liquid-phase catalytic oxidation sulfur recovery system. The sulfur recovery system may include a biological sulfur recovery system.

The sulfur recovery system may include, in fluid communication with the Claus sulfur recovery system, a SUPERCLAUS sulfur recovery system.

The sulfur recovery system may include, in fluid communication with the Claus sulfur recovery system, a EURO-CLAUS sulfur recovery system.

The sulfur recovery system may include, in fluid communication with the Claus sulfur recovery system, a biological sulfur recovery system.

The sulfur recovery system may include, in fluid communication with the Claus sulfur recovery system, a liquid-phase catalytic oxidation sulfur recovery system The apparatus may include a regulatory system that is in fluid communication with, and upstream from, the ammonia desulfurization system. The regulatory system may include a temperature regulator configured to regulate a gas temperature in the regulatory system. The regulatory system may include a humidity regulator configured to regulate a gas humidity in the regulatory system.

The apparatus may include a sulfur removal device in fluid communication with the ammonia desulfurization system. The apparatus may include a dust removal apparatus in fluid communication with the ammonia desulfurization system.

The apparatus may include an impurity removal apparatus in fluid communication with the ammonia desulfurization system.

The apparatus may include a sulfur removal device in fluid communication with the ammonia desulfurization system; and a dust removal apparatus in fluid communication with the ammonia desulfurization system.

The apparatus may include a sulfur removal device in fluid communication with the ammonia desulfurization system; and an impurity removal apparatus in fluid communication with the ammonia desulfurization system.

The apparatus may include a dust removal apparatus in fluid communication with the ammonia desulfurization system; and an impurity removal apparatus in fluid communication with the ammonia desulfurization system.

The acid gas pre-treatment system; the regulatory system; and the ammonia desulfurization system may be connected successively along a downstream direction.

The acid gas pre-treatment system may include a sulfur recovery system plus incineration system.

The apparatus may include a regulatory system that is in fluid communication with, and upstream from, the ammonia desulfurization system. The regulatory system may include a temperature regulator configured to regulate a gas temperature in the regulatory system. The regulatory system may include a humidity regulator configured to regulate a gas humidity in the regulatory system.

The apparatus may include a sulfur removal device in fluid communication with the ammonia desulfurization system.

The acid gas pre-treatment system; the regulatory system; and the ammonia desulfurization system may be connected successively along a downstream direction.

The acid gas pre-treatment system may include a sulfur recovery system plus incineration system. In the regulatory system, the temperature regulator, humidity regulator and a the sulfur removal device may be connected successively in the downstream direction. In the regulatory system, the temperature regulator, humidity regulator and a the sulfur removal device are connected successively in the downstream direction.

The ammonia desulfurization system: may be configured to circulate ammonia-containing absorption liquid; and may include an absorption liquid treatment system that may include one or more of: a concentration device configured to receive the absorption liquid; a solid-liquid separation device configured to collect solids suspended in the liquid; and a drying device configured to dry the collected solids.

The absorption liquid treatment system may include a solution purification device in fluid communication with, and disposed in a direction operationally downstream from, the solid-liquid separation device. The absorption liquid treatment may system includes an evaporation crystallization device that: may be in fluid communication with one or both of: the concentration device; and the solid-liquid separation device; and may be disposed, operationally: downstream from the concentration device; and upstream from the solid-liquid separation device.

The absorption liquid treatment system may include an evaporation crystallization device that may be: in fluid communication with one or both of: the concentration device; and the solid-liquid separation device; and may be disposed, operationally: downstream from the concentration device; and upstream from the solid-liquid separation device.

The solution purification device may include an oil removal device that is in fluid communication with the solid-liquid separation device.

The solution purification device may include a suspended matter removal device that is in fluid communication with the solid-liquid separation device.

The solution purification device may include a suspended matter removal device that is in fluid communication with the solid-liquid separation device.

The suspended matter removal device may be configured to provide a circulating absorption liquid that has a suspended matter content no greater than 200 mg/L. The suspended matter content may be in the range 20-100 mg/L. The suspended matter content may be in the range 30-50 mg/L.

The oil removal device may include, in fluid communication with the solid-liquid separation device, an air flotation device.

The oil removal device may include, in fluid communication with the solid-liquid separation device, an adsorption device.

The oil removal device may include, in fluid communication with the solid-liquid separation device, a precision filtration device.

The oil removal device may include, in fluid communication with the solid-liquid separation device, an adsorption device.

The oil removal device may include, in fluid communication with the solid-liquid separation device, a precision filtration device.

The oil removal device further includes, in fluid communication with the solid-liquid separation device, a precision filtration device.

The oil removal device may be configured to produce a circulating absorption liquid having an oil content no greater than 100 mg/L. The oil content may be in the range 10-80 mg/L. The oil content may be in the range 20-30 mg/L. The oil removal device may be in fluid communication with, and disposed operationally upstream from, the incineration system. The methods may include receiving acid gas; and deriving from the acid gas: one or both of ammonium sulfate; and net tail gas that meets a discharge standard. The discharge standard may be a standard defined in the document entitled, "Emission Standard of Pollutants for Petroleum Refining Industry," published as China, GB31570-2015, which is hereby incorporated by reference herein in its entirety.

The discharge standard may be a standard defined in the document entitled, "Emission Standard of Pollutants for Petroleum Chemistry Industry," published as China, GB31571-2015, which is hereby incorporated by reference herein in its entirety. Illustrative examples of pollutant emission standards "Emission Standard of Pollutant for Oil Refining Industry" Tables 3 4, excerpted below, show the pollutant emission standards of regenerated flue gas for process heating furnaces, FCC catalyst regeneration flue gas, particulate matter in tail gas of acid gas recovery plants, nickel and its compounds, sulfur dioxide and sulfuric acid mist.

From "Emission Standard of Pollutant for Oil Refining Industry" Table 3: Special Emission Limits of Air Pollutants (Units of Measurement: m/m$^3$)

| Number | Pollutants | Acid gas recovery devices | Location of Pollutant Emission Monitoring Device |
|---|---|---|---|
| 1 | particulate matter | — | Exhaust pipe for workshop or production facility |
| 2 | nickel and its compounds | — | |
| 3 | sulfur dioxide | 400 | |
| 4 | nitrogen oxides | | |
| 5 | sulphuric acid mist | 30(4) | |
| 6 | hydrogen chloride | — | |
| 7 | pitch lume | — | |
| 8 | benzo(a)pyrene | — | |
| 9 | benzene | — | |
| 10 | toluene | — | |
| 11 | xylene | — | |
| 12 | NMHC | — | |

From "Emission Standard of Pollutant for Oil Refining Industry" Table 4: Special Emission Limits of Air Pollutants (Units of Measurement: mg/m3)

| Number | Pollutants | Process heating furnace | FCC catalyst regeneration flue gas (1) | Acid gas recovery devices | Location of Pollutant Emission Monitoring Device |
|---|---|---|---|---|---|
| 1 | particulate matter | n/a | 30 | — | Exhaust pipe for workshop or production facility |
| 2 | nickel and its compounds | — | 0.3 | — | |
| 3 | sulfur dioxide | 50 | 50 | 100 | |
| 4 | nitrogen oxides | 100 | 100 | — | |
| 5 | sulphuric acid mist | — | — | 5(3) | |
| 6 | hydrogen chloride | — | — | — | |
| 7 | pitch fume | — | — | — | |
| 8 | benzo(a)pyrene | — | — | — | |
| 9 | benzene | — | — | — | |
| 10 | toluene | — | — | — | |
| 11 | xylene | — | — | — | |
| 12 | NMHC | — | — | — | |

Notes
(1) The maximum value of the concentration of the regenerated flue gas pollutants in the catalytic cracking waste heat boiler does not exceed 2 times of the limit value in the table, and the time duration of each time is not greater than 1 hour.

"Emission Standard of Pollutant for Petroleum Chemistry Industry" Tables 4 and 5, excerpted below, show emission requirements of particulate matters and sulfur dioxide in tail gas of process heating furnace device.

From "Emission Standard of Pollutant for Petroleum Chemistry Industry" Table 4: Emission Limits of Air Pollutants (Part) (Units of Measurement: mg/m3)

| Number | Pollutants | Process heating furnace | Location of Pollutant Emission Monitoring Device |
|---|---|---|---|
| 1 | particulate matter | 20 | Exhaust pipe for workshop or production facility |
| 2 | sulfur dioxide | 100 | |
| 3 | nitrogen oxides | 150 180(3) | |

From "Emission Standard of Pollutant for Petroleum Chemistry Industry" Table 5: Special Emission Limits of Air Pollutants (Part) Units of Measurement: mg/m3)

| Number | Pollutants | Process heating furnace | Location of Pollutant Emission Monitoring Device |
|---|---|---|---|
| 1 | particulate matter | 20 | Exhaust pipe for workshop or production facility |
| 2 | sulfur dioxide | 50 | |
| 3 | nitrogen oxides | 100 | |

The deriving may include: one or both of recovering sulfur from the acid gas to produce sulfur-recovered tail gas; and, then, incinerating the sulfur-recovered gas.

The deriving may include producing sulfuric acid from the acid gas.

The deriving may include incinerating.

The method may include channeling the acid gas from a petrochemical chemical reaction. The method may include channeling the acid gas from a natural gas chemical reaction. The method may include channeling the acid gas from a coal chemical reaction.

The deriving may include generating catalytic cracking regeneration flue gas. The acid tail gas may include the regeneration flue gas.

The deriving may include adjusting an enthalpy value of acid tail gas.

The deriving may include passing adjusted tail gas through one or more of: a cooling stage, an absorption stage, and a water-washing stage, all in an ammonia circulation desulfurization reactor.

The adjusting may include changing a temperature of the acid tail gas.

The adjusting may include changing a humidity of the acid tail gas.

The adjusting may include changing a temperature of the acid tail gas.

The adjusting may include removing sulfur from the acid tail gas.

The adjusting may include removing dust from the acid tail gas.

The adjusting may include removing an impurity from the acid tail gas.

The adjusting may adjust the value to 60-850 kJ/kg dry gas. The adjusting may adjust the value to 80-680 kJ/kg dry gas. The adjusting may adjust the value to 100-450 kJ/kg dry gas.

The recovering may include flowing the acid gas through a Claus sulfur recovery system having 1 stage. The recovering may include flowing the acid gas through a Claus sulfur recovery system having 2 stages. The recovering may include flowing the acid gas through a Claus sulfur recovery system having 3 stages.

The recovering may include flowing the acid gas through a liquid-phase catalytic oxidation sulfur recovery system. The recovering may include flowing the acid gas through a biological sulfur recovery system. The recovering may include flowing the acid gas through a SUPERCLAUS sulfur recovery system. The recovering may include flowing the acid gas through a EUROCLAUS sulfur recovery system. The recovering further includes flowing the acid gas through a biological sulfur recovery system. The recovering may include flowing the acid gas through a liquid-phase catalytic oxidation sulfur recovery system.

The sulfuric acid production may include wet sulfuric acid production. The sulfuric acid production may include dry sulfuric acid production.

The recovering may include producing sulfur-recovered gas having a molar ratio $H_2S/SO_2$ in the range 1.2-3. The molar ratio may be in the range 1.5-2.5.

The incinerating may be performed at a temperature in the range 600° C.-1,300° C. The incinerating may produce an acid tail gas.

In the incinerating, the sulfur-recovered tail gas may have a residence time in the range 1 to 6 s.

The acid tail gas may have an oxygen content in the range 2%-5%.

The acid tail gas may have a sulfur oxide content in the range 2,000 mg/Nm³ to 150,000 mg/Nm³. The incinerating may be performed at a temperature in the range 650° C. to 950° C.

In the incinerating, the sulfur-recovered tail may have a residence time in the range 1.5 to 4 s.

The acid tail gas may have an oxygen content in the range 3%-4%.

The acid tail gas may have a sulfur oxide content in the range 5,000 mg/Nm³ to 55,000 mg/Nm³.

The method may include producing an acid tail gas having a sulfur oxide content in the range 2,000 mg/Nm³ to 150,000 mg/Nm³.

The incinerating may be performed at a temperature in the range 600° C.-1,300° C. The incinerating may produce the acid tail gas.

The method may include incinerating sulfur-recovered tail gas having an incineration residence time in the range 1 to 6 s.

The acid tail gas may have an oxygen content in the range 2%-5%.

The incinerating may be performed at a temperature in the range 650° C. to 950° C.

In the incinerating, the sulfur-recovered tail gas may have a residence time in the range 1.5 to 4 s.

The acid tail gas may have an oxygen content in the range 3%-4%.

The acid tail gas may have a sulfur oxide content in the range 5,000 mg/Nm³ to 55,000 mg/Nm³.

The method may include producing an acid tail gas having an oxygen content in the range 2%-5%.

The acid tail gas may have a sulfur oxide content in the range 2,000 mg/Nm³ to 150,000 mg/Nm³.

The incinerating may be performed at a temperature in the range 600° C.-1,300° C. The incinerating may produce the acid tail gas.

In the incinerating, the sulfur-recovered tail gas may have a residence time in the range 1 to 6 s.

The incinerating may be performed at a temperature in the range 650° C. to 950° C.

In the incinerating, the sulfur-recovered tail gas may have a residence time in the range 1.5 to 4 s.

The acid tail gas may have an oxygen content in the range 3%-4%.

The acid tail gas may have a sulfur oxide content in the range 5,000 mg/Nm³ to 55,000 mg/Nm³.

In the incinerating, the sulfur-recovered tail gas may have a residence time in the range 1 to 6 s.

The method may include producing acid tail gas having an oxygen content in the range 2%-5%.

The method may include producing acid tail having a sulfur oxide content in the range 2,000 mg/Nm³ to 150,000 mg/Nm³.

The incinerating may be performed at a temperature in the range 600° C.-1,300° C. The incinerating may produce the acid tail gas.

The incinerating may be performed at a temperature in the range 650° C. to 950° C.

In the incinerating, the sulfur-recovered tail gas may have a residence time in the range 1.5 to 4 s.

The acid tail gas may have an oxygen content in the range 3%-4%.

The acid tail gas may have a sulfur oxide content in the range 5,000 mg/Nm³ to 55,000 mg/Nm³.

The deriving may include reducing a suspended matter content of an ammonia desulfurization circulating absorption liquid to no greater than 200 mg/L.

The deriving may include reducing an oil content of an ammonia desulfurization circulating absorption liquid to no greater than 100 mg/L.

The deriving may include reducing an oil content of an ammonia desulfurization circulating absorption liquid to no greater than 100 mg/L.

The adjusting may produce adjusted tail gas having an organic matter content not greater than 30 ppm.

The adjusting may produce adjusted tail gas having an elementary sulfur and hydrogen sulfide content not greater than 30.

The adjusting may produce adjusted tail gas having an organic matter content not greater than 10 ppm.

The adjusting may produce adjusted tail gas having an elementary sulfur and hydrogen sulfide content not greater than 10 ppm.

The acid gas may be treated by sulfur recovery plus incineration or sulfuric acid production or incineration, or directly by catalytic cracking catalyst regeneration process to obtain acid tail gas.

The acid tail gas may be fed into the regulatory system to adjust the enthalpy value of the tail gas to be within the range of 60-850 kJ/kg dry gas, for example, 80-680 kJ/kg dry gas, or 100-450 kJ/kg dry gas.

Acid tail gas meeting a selected enthalpy criterion may be fed into the ammonia desulfurization process for treatment, to achieve the purpose that net tail gas meets a discharge standard through multi-stage circulating absorption.

Some embodiments may omit features shown and/or described in connection with the illustrative apparatus. Some embodiments may include features that are neither shown nor described in connection with the illustrative apparatus. Features of illustrative apparatus and methods may be combined. For example, one illustrative embodiment may include features shown in connection with another illustrative embodiment.

The steps of illustrative methods may be performed in an order other than the order shown and/or described herein.

Some embodiments may omit steps shown and/or described in connection with the illustrative methods. Some embodiments may include steps that are neither shown nor described in connection with the illustrative methods. Illustrative method steps may be combined. For example, one illustrative method may include steps shown in connection with another illustrative method.

Embodiments may involve some or all of the features of the illustrative apparatus and/or some or all of the steps of the illustrative methods.

Apparatus and methods described herein are illustrative. Apparatus and methods in accordance with the invention will now be described in connection with the Examples and the FIGs, which form a part hereof. The FIGS. show illustrative features of apparatus and method steps in accordance with the principles of the invention. It is to be understood that other embodiments may be utilized and that structural, functional and procedural modifications may be made without departing from the scope and spirit of the present invention.

ILLUSTRATIVE EXAMPLES

Example 1

Acid gas 1 derived from petrochemical industry was used. The acid gas 1 was passed through a sulfur recovery system 2 to obtain sulfur-recovered tail gas 6, and then passed through an incineration system 5 to obtain acid tail gas 6 (pre-treatment system). The enthalpy value of the acid tail gas was adjusted by a regulatory system 7, and then the adjusted tail gas 8 was fed into an ammonia desulfurization system 10 to which ammonia 9 was introduced. The multi-stage circulating absorption of the ammonia desulfurization system 10 included a 1-stage cooling cycle, a 2-stage $SO_2$ absorption cycle, and a 2-stage water-washing cycle.

Figure 3:
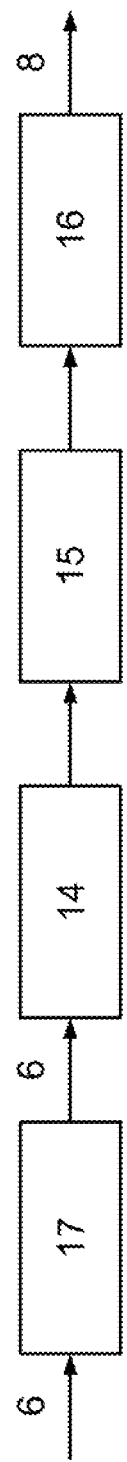
FIG. 3 shows illustrative apparatus of a regulatory system in accordance with principles of the invention.

The adjusting system 7 herein as shown in FIG. 3 included an impurity removal apparatus 17, a cooling apparatus 14, a dehumidifying apparatus 15, and a sulfur removal device 16 which were connected successively. The organic matter content of the acid tail gas was reduced to 4.5 ppm or lower by the impurity removal apparatus 17, the enthalpy value of the acid tail gas 6 was further adjusted to 600-810 kJ/kg dry gas through the cooling apparatus 14, and then the low-temperature carbon dioxide gas with a low water vapor content was supplemented through the dehumidifying apparatus 15 to further adjust the enthalpy value of the acid tail gas 6 to 410-505 kJ/kg dry gas. Then, the elementary sulfur and hydrogen sulfide content of the adjusted tail gas 8 was controlled to 3 ppm or lower by adsorbing sulfur and hydrogen sulfide in the tail gas through the adsorption sulfur-removal apparatus 16.

In this example, the hydrogen sulfide content of the acid gas 1 was 75%, and the rest were nitrogen, carbon dioxide, hydrogen, and carbon monoxide; and the sulfur recovery system 2 adopted the air-method 2-stage Claus sulfur recovery process. The molar ratio of $H_2S/SO_2$ in the sulfur-recovered tail gas 4 was controlled at 1.4-2.2, the incineration temperature of the incineration system 5 was 750° C.-810° C., the residence time was 2-2.8 s, the oxygen content of the acid tail gas was 2.8%, and the sulfur oxide content was 22,400 mg/$Nm^3$.

The flow rate of the acid gas 1 was 8,100 $Nm^3$/h, the sulfur recovery rate was 93.6%, the annual operating time was 8,400 h, 68,200 tons of sulfur 3 per year and 19,000 tons of ammonium sulfate 11 per year were obtained, and the ammonia recovery rate was 99.1%.

Accordingly, the apparatus for carrying out the above-mentioned treatment method in this example comprises an acid gas pre-treatment system (sulfur recovery system plus incineration system), a regulatory system, and an ammonia desulfurization system which are connected successively.

The sulfur recovery system included a blower apparatus, a thermal reaction apparatus and a 2-stage Claus catalytic reaction apparatus.

In addition, the regulatory system included the impurity removal apparatus, cooling apparatus, dehumidifying apparatus and desulfurization apparatus which were connected successively. The impurity removal apparatus was a catalytic oxidation apparatus, the desulfurization apparatus was an activated carbon adsorption apparatus, the cooling apparatus was a one-stage waste heat recovery, with the by-product of 0.3-0.5 MPa saturated steam, and the dehumidifying apparatus was connected to a carbon dioxide gas source.

The apparatus included an absorption liquid treatment system, which included a concentration circulating tank, a solid-liquid separation apparatus, and a drying apparatus. The ammonia desulfurization system adopted a saturated crystallization process in the tower.

The amount of the adjusted tail gas was 68,450 $Nm^3$/h (standard state, wet base, actual oxygen), the $SO_2$ concentration was 16,100 mg/$Nm^3$, the tower had a diameter of 3.2 m and a height of 42 m, the sulfur dioxide content of the net tail gas was 32.4 mg/$Nm^3$, the free ammonia was 1.3 mg/$Nm^3$, and the total dust was 9.5 mg/$Nm^3$.

For the ammonia desulfurization apparatus and methods in this example, reference can be made to CN 201710379460.3, CN 201710865004.X, and CN 201810329999.2.

Example 2

Acid gas 1 derived from natural gas chemical industry was used. The acid gas 1 was passed through a sulfuric acid production system 13 to obtain sulfuric acid 3 and acid tail gas 6, and then the enthalpy value of the acid tail gas was adjusted by a regulatory system 7. Then the adjusted tail gas was fed into the ammonia desulfurization system 10 to which ammonia 9 was added. The multi-stage circulating absorption of the ammonia desulfurization system 10 included a 1-stage cooling cycle, a 1-stage $SO_2$ absorption cycle, and a 1-stage water-washing cycle.

Here, the regulatory system 7 was a water vapor addition apparatus, and the enthalpy value of the acid tail gas 6 was adjusted to 320-410 kJ/kg dry gas by adding water vapor.

In the acid gas 1 used, the hydrogen sulfide content was 45%, the $CO_2$ content was 30%, and the rest were nitrogen, hydrogen, carbon monoxide and methane. The sulfuric acid production system 13 adopted a wet sulfuric acid production process. The sulfur oxide content in the acid tail gas was 5,350 mg/$Nm^3$.

The flow rate of the acid gas 1 was 7,200 $Nm^3$/h, the sulfuric acid recovery rate was 98%, the annual operating time was 8,400 h, and 119,000 tons of sulfuric acid 3 per year and 3,200 tons of ammonium sulfate 11 per year were obtained, and the ammonia recovery rate was 99.4%.

Accordingly, the apparatus for carrying out the above-mentioned method included a wet sulfuric acid production system, a regulatory system and an ammonia desulfurization system which were connected successively.

The wet sulfuric acid production system included an incineration apparatus, a conversion apparatus and a condensing apparatus.

The regulatory system included a water vapor addition apparatus.

The apparatus included an absorption liquid treatment system, which included a solid-liquid separation apparatus, a drying apparatus. The ammonia desulfurization system adopted a saturated crystallization process in the tower.

The amount of the adjusted tail gas was 38,450 Nm³/h (standard state, wet base, actual oxygen), the $SO_2$ concentration was 4,830 mg/Nm³, the tower had a diameter of 2.6 m and a height of 33 m, the sulfur dioxide content of the net tail gas was 16.8 mg/Nm³, the free ammonia content was 0.6 mg/Nm³, and the total dust was 4.5 mg/Nm³.

For the ammonia desulfurization apparatus and methods in this example, reference can be made to CN 201710379460.3, CN 201710865004.X, and CN 201810329999.2.

Example 3

Acid tail gas derived from a petrochemical catalytic cracking catalyst regeneration was used. The enthalpy value of the acid tail gas was adjusted by a regulatory system, and then the acid tail gas was fed into an ammonia desulfurization system. The multi-stage circulating absorption of the ammonia desulfurization system included a 2-stage washing cycle, a 1-stage $SO_2$ absorption cycle, and a 1-stage water-washing cycle.

The regulatory system was a cooling apparatus, a dust removal apparatus and an impurity removal apparatus. The organic matter content was reduced to 6.2 ppm or less by the impurity removal apparatus. The enthalpy value of the acid tail gas was further adjusted to 370-408 kJ/kg dry gas through the cooling apparatus. Then the total dust content was reduced to 20-30 mg/Nm³ by the dust removal apparatus.

The flow rate of the acid tail gas was 210,000 Nm³/h, the sulfur oxide content was 2,350 mg/Nm³, and the total dust content was 100-230 mg/Nm³. The annual operating time was 8,400 h, 4,100 tons of ammonium sulfate per year were obtained after the treatment of the ammonia desulfurization system, and the ammonia recovery rate was 99.3%.

Accordingly, the apparatus for carrying out the above-mentioned method included a catalytic cracking catalyst regeneration system, and the regulatory system and ammonia desulfurization system connected successively.

The regulatory system included a cooling apparatus, a dust removal apparatus, and an impurity removal apparatus.

The apparatus included an absorption liquid treatment system, which included an evaporation crystallization apparatus, a solid-liquid separation apparatus, and a drying apparatus.

The absorption liquid treatment system included a solution purification apparatus. The solution purification apparatus included an oil removal apparatus and a suspended matter removal apparatus, which were configured to form a circulating absorption liquid with an oil content of ≤80 mg/L and a suspended matter content of ≤120 mg/L. The oil removal apparatus was an air flotation apparatus plus precision filtration apparatus, and the suspended matter removal apparatus was a press filtration apparatus such as a plate and frame filter press.

The oil removal apparatus is connected to the incineration system, and the waste oil was completely incinerated into water, carbon dioxide and sulfur dioxide in the incineration system.

The absorption tower had a diameter of 6 m and a height of 32 m, the sulfur dioxide content of the net tail gas was 23.3 mg/Nm³, the free ammonia content was 0.75 mg/Nm³, and the total dust was 14.5 mg/Nm³.

For the ammonia desulfurization apparatus and methods of this example, reference can be made to CN 201710379460.3 and CN 201810057884.2 for which have been applied by the applicant.

Comparative Example 1

Example 1 was repeated except that the acid tail gas was not adjusted by the regulatory system 7, but the acid tail gas that had been subjected to one-stage waste heat recovery was directly fed into the ammonia desulfurization system. The parameters of the tail gas entering the ammonia desulfurization system and the operation effects are compared as follows:

| Number | Comparison item | Unit | Example 1 | Comparative Example 1 |
|---|---|---|---|---|
| 1 | Enthalpy value of the tail gas | kJ/kg | 410-505 | 910-1000 |
| 2 | Organic matter content of the tail gas | ppm | 4.5 | 37 |
| 3 | Sulfur and sulfide content of the tail gas | ppm | 3 | 42 |
| 4 | Absorption temperature | ° C. | 50-57 | 70-85 |
| 5 | Sulfur dioxide content of the net tail gas | mg/Nm³ | 32.4 | 123 |
| 6 | Free ammonia content of the net tail gas | mg/Nm³ | 1.3 | 26.8 |
| 7 | Total dust content of the net tail gas | mg/Nm³ | 9.5 | 47.9 |
| 8 | Ammonia recovery rate of the ammonia desulfurization system | % | 99.1 | 94.3 |

It can be seen that the sulfur dioxide concentration, free ammonia content and total dust content of the net tail gas in Comparative Example 1 were all higher than those in Example 1, and the ammonia recovery rate was only 94.3%, which was 4.7% lower than that in Example 1, resulting in a large amount of secondary pollution.

Comparative Example 2

Example 2 was repeated except that the acid tail gas was not adjusted by the regulatory system 7, but the acid tail gas was directly fed into the ammonia desulfurization system. The parameters of the tail gas entering the ammonia desulfurization system and the operation effects are compared as follows:

| Number | Comparison item | Unit | Example 2 | Comparative Example 2 |
|---|---|---|---|---|
| 1 | Enthalpy value of the tail gas | kJ/kg | 320-410 | 30-52 |
| 2 | Absorption temperature | ° C. | 47-50 | 30-35 |
| 3 | Sulfur dioxide content of the net tail gas | mg/Nm³ | 16.8 | 37 |
| 4 | Free ammonia content of the net tail gas | mg/Nm³ | 0.6 | 4.8 |
| 5 | Total dust content of the net tail gas | mg/Nm³ | 4.5 | 18.3 |
| 6 | Ammonia recovery rate of the ammonia desulferization system | % | 99.4 | 97.2 |

It can be seen that the sulfur dioxide concentration, free ammonia content and total dust content of the net tail gas in Comparative Example 2 were all higher than those in Example 2, and the ammonia recovery rate was only 97.2%, which was 2.2% lower than that in Example 2, resulting in a large amount of secondary pollution.

Comparative Example 3

Example 3 was repeated except that the acid tail gas was not adjusted by the regulatory system, but the acid tail gas of the catalytic cracking catalyst regeneration system that had been subjected to waste heat recovery and denitrification was directly fed into the ammonia desulfurization system. The parameters of the tail gas entering the ammonia desulfurization system and the operation effects are compared as follows:

| Number | Comparison item | Unit | Example 3 | Comparative Example 3 |
|---|---|---|---|---|
| 1 | Enthalpy value of the tail gas | kJ/kg | 370-408 | 930-1150 |
| 2 | Organic matter content of the tail gas | ppm | ≤6.2 | 18.9 |
| 3 | Total dust content of the tail gas | mg/Nm³ | 20-30 | 150-300 |
| 4 | Absorption temperature | °C. | 47.5-49.8 | 80-90 |
| 5 | Sulfur dioxide content of the net tail gas | mg/Nm³ | 23.3 | 169 |
| 6 | Free ammonia content of the net tail gas | mg/Nm³ | 0.75 | 33.7 |
| 7 | Total dust content of the net tail gas | mg/Nm³ | 14.5 | 102 |
| 8 | Ammonia recovery rate of the ammonia desulfurization system | % | 99.3 | 91.3 |

It can be seen that the sulfur dioxide concentration, free ammonia content and total dust content of the net tail gas in Comparative Example 3 were all higher than those in Example 3, and the ammonia recovery rate was only 91.3%, which was 8% lower than that in Example 3, resulting in a large amount of secondary pollution.

Some illustrative embodiments are identified below:
(A) A method for treating acid gas, wherein the ammonia desulfurization process is used to treat acid tail gas, thereby achieving the purpose that net tail gas meets the discharge standard through multi-stage circulating absorption.
(B) The method of (A), wherein the acid tail gas comprises the tail gas obtained after treating the petrochemical, natural gas chemical, and coal chemical acid gas with a process such as sulfur recovery plus incineration, sulfuric acid production, and incineration.
(C) The method of (A), wherein the acid tail gas comprises catalytic cracking regeneration flue gas.
(D) The method of any one of (B)-(C), wherein the enthalpy value of the acid tail gas is first adjusted by a regulatory system, and then the acid tail gas is fed into a subsequent ammonia desulfurization process.
(E) The method of (A), wherein the multi-stage circulating absorption comprises a cooling cycle, an absorption cycle, and a water-washing cycle.
(F) The method of (D), wherein the regulatory system comprises a temperature adjustment unit and/or a humidity adjustment unit, or both a temperature adjustment unit and a humidity adjustment unit.
(G) The method of (F), wherein the regulatory system further comprises one or more of a sulfur removal unit, a dust removal unit, and an impurity removal unit.
(H) The method of (D), wherein the enthalpy value of the tail gas after the adjustment is within the range of 60-850 kJ/kg dry gas, for example, 80-680 kJ/kg dry gas or 100-450 kJ/kg dry gas.
(I) The method of (B), wherein the sulfur recovery is performed with a sulfur recovery process, such as a 1 to 3-stage Claus sulfur recovery process, a SUPERCLAUS sulfur recovery process, an EUROCLAUS sulfur recovery process, a liquid-phase catalytic oxidation sulfur recovery process or a biological sulfur recovery process; and the sulfuric acid production process is performed with a wet sulfuric acid production process or a dry sulfuric acid production process.
(J) The method of (I), wherein the molar ratio of $H_2S/SO_2$ in the sulfur-recovered tail gas is controlled at 1.2-3, for example, 1.5-2.5.
(K) The method of (B), wherein in the sulfur recovery plus incineration process and the incineration process, the incineration temperature is 600° C.-1,300° C., for example 650° C.-950° C., the residence time is 1-6 s, for example 1.5-4 s, the oxygen content of the acid tail gas is 2%-5%, for example, 3%-4%, and sulfur oxide content of the acid tail gas is 2,000-150,000 mg/Nm³, for example, 5,000-55,000 mg/Nm³.
(L) The method of (A), wherein the circulating absorption liquid of ammonia desulfurization is subjected to a purification treatment such that the suspended matter content in the circulating absorption liquid is ≤200 mg/L and/or the oil content is ≤100 mg/L.
(M) The method of (G), wherein the organic matter content of the tail gas after adjustment is ≤30 ppm, for example, ≤10 ppm, and/or the elementary sulfur and hydrogen sulfide content is ≤30 ppm, for example, ≤10 ppm.
(N) The method of any one of (A)-(M), wherein the specific process steps include:
1) acid gas is treated by sulfur recovery plus incineration or sulfuric acid production or incineration, or directly by catalytic cracking catalyst regeneration process to obtain acid tail gas;
2) the acid tail gas is fed into the regulatory system to adjust the enthalpy value of the tail gas to be within the range of 60-850 kJ/kg dry gas, for example, 80-680 kJ/kg dry gas or 100-450 kJ/kg dry gas;
3) the acid tail gas which meets the enthalpy value requirement is fed into the ammonia desulfurization process for treatment, to achieve the purpose that net tail gas meets the discharge standard through multi-stage circulating absorption.
(O) A apparatus for treating acid gas, wherein the apparatus comprises an acid gas pre-treatment system and an ammonia desulfurization system.
(P) The apparatus of (O), wherein the pre-treatment system comprises a sulfur recovery system plus incineration system, a sulfuric acid production system, an incineration system, and a catalytic cracking catalyst regeneration system.
(Q) The apparatus of (P), wherein the sulfur recovery system comprises a 1 to 3-stage Claus sulfur recovery system, a SUPERCLAUS sulfur recovery system, an EUROCLAUS sulfur recovery system, a liquid-phase catalytic oxidation sulfur recovery system and biological sulfur recovery system.
(R) The apparatus of (O), wherein the apparatus also comprises a regulatory system comprising a temperature regulating apparatus and/or a humidity regulating apparatus, or both a temperature regulating apparatus and a humidity regulating apparatus.

(S) The apparatus of (Q), wherein the regulatory system further comprises one or more of a sulfur removal apparatus, a dust removal apparatus, and an impurity removal apparatus.

(T) The apparatus of (S), wherein the acid gas pre-treatment system, the regulatory system, and the ammonia desulfurization system are connected successively, the acid gas pre-treatment system includes a sulfur recovery system plus incineration system; and the regulatory system includes a temperature regulating apparatus, a humidity regulating apparatus and a sulfur removal apparatus that are connected successively.

(U) The apparatus of (O), wherein the apparatus further comprises an absorption liquid treatment system, which comprises a concentration apparatus, a solid-liquid separation apparatus, and a drying apparatus.

(V) The apparatus of (U), wherein the absorption liquid treatment system further comprises one or more of a solution purification apparatus and an evaporation crystallization apparatus.

(W) The apparatus of (V), wherein the solution purification apparatus may include one or more of an oil removal apparatus and a suspended matter removal apparatus.

(X) The apparatus of (W), wherein the suspended matter removal apparatus is configured to form a circulating absorption liquid with a suspended matter content of ≤200 mg/L, for example, 20-100 mg/L or 30-50 mg/L.

(Y) The apparatus of (W), wherein the oil removal apparatus is an air flotation apparatus, an adsorption apparatus or a precision filtration apparatus, or a combination thereof.

(Z) The apparatus of (Y), wherein the oil removal apparatus is configured to form a circulating absorption liquid with an oil content of ≤100 mg/L, for example, 10-80 mg/L or 20-30 mg/L.

(AA) The apparatus of any one of (V)-(Z), wherein the oil removal apparatus is connected to the incineration system.

1. Apparatus for treating acid gas, the apparatus comprising:
   an acid gas pre-treatment system; and,
   in fluid communication with the acid gas pre-treatment system, an ammonia desulfurization system.
2. The apparatus of embodiment 1 wherein the pre-treatment system includes a sulfur recovery system plus incineration system.
3. The apparatus of embodiment 1 wherein the pre-treatment system includes a sulfuric acid production system.
4. The apparatus of embodiment 1 wherein the pre-treatment system includes a catalytic cracking catalyst regeneration system.
5. The apparatus of embodiment 2 wherein the sulfur recovery system includes a Claus sulfur recovery system having 1 stage.
6. The apparatus of embodiment 2 wherein the sulfur recovery system includes a Claus sulfur recovery system having 2 stages.
7. The apparatus of embodiment 2 wherein the sulfur recovery system includes a Claus sulfur recovery system having 3 stages.
8. The apparatus of embodiment 2 wherein the sulfur recovery system includes a liquid-phase catalytic oxidation sulfur recovery system
9. The apparatus of embodiment 2 wherein the sulfur recovery system includes a biological sulfur recovery system.
10. The apparatus of any of embodiments 5 to 7 wherein the sulfur recovery system further includes, in fluid communication with the Claus sulfur recovery system, a SUPERCLAUS sulfur recovery system.
11. The apparatus of any of embodiments 5 to 7 wherein the sulfur recovery system further includes, in fluid communication with the Claus sulfur recovery system, a EUROCLAUS sulfur recovery system.
12. The apparatus of any of embodiments 5 to 7 wherein the sulfur recovery system further includes, in fluid communication with the Claus sulfur recovery system, a biological sulfur recovery system.
13. The apparatus of any of embodiments 5 to 7 wherein the sulfur recovery system further includes, in fluid communication with the Claus sulfur recovery system, a liquid-phase catalytic oxidation sulfur recovery system
14. The apparatus of embodiment 1 further comprising a regulatory system that is in fluid communication with, and upstream from, the ammonia desulfurization system.
15. The apparatus of embodiment 14 wherein the regulatory system includes a temperature regulator configured to regulate a gas temperature in the regulatory system.
16. The apparatus of embodiment 15 wherein the regulatory system includes a humidity regulator configured to regulate a gas humidity in the regulatory system.
17. The apparatus of embodiment 14 wherein the regulatory system includes a humidity regulator configured to regulate a gas humidity in the regulatory system.
18. The apparatus of any of embodiments 14 to 17 further comprising a sulfur removal device in fluid communication with the ammonia desulfurization system
19. The apparatus of any of embodiments 14 to 17 further comprising a dust removal apparatus in fluid communication with the ammonia desulfurization system.
20. The apparatus of any of embodiments 14 to 17 further comprising an impurity removal apparatus in fluid communication with the ammonia desulfurization system.
21. The apparatus of any of embodiments 14 to 17 further comprising:
   a sulfur removal device in fluid communication with the ammonia desulfurization system; and a dust removal apparatus in fluid communication with the ammonia desulfurization system.
22. The apparatus of any of embodiments 14 to 17 further comprising:
   a sulfur removal device in fluid communication with the ammonia desulfurization system; and
   an impurity removal apparatus in fluid communication with the ammonia desulfurization system.
23. The apparatus of any of embodiments 14 to 17 further comprising:
   a dust removal apparatus in fluid communication with the ammonia desulfurization system; and
   an impurity removal apparatus in fluid communication with the ammonia desulfurization system.
24. The apparatus of any of embodiments 18 to 23 wherein:
   the acid gas pre-treatment system;
   the regulatory system; and
   the ammonia desulfurization system are connected successively along a downstream direction.
25. The apparatus of embodiment 24 wherein the acid gas pre-treatment system includes a sulfur recovery system plus incineration system.

26. The apparatus of embodiment 1 further comprising a regulatory system that is in fluid communication with, and upstream from, the ammonia desulfurization system.

27. The apparatus of embodiment 26 wherein the regulatory system includes a temperature regulator configured to regulate a gas temperature in the regulatory system.

28. The apparatus of embodiment 27 wherein the regulatory system includes a humidity regulator configured to regulate a gas humidity in the regulatory system.

29. The apparatus of embodiment 28 further comprising a sulfur removal device in fluid communication with the ammonia desulfurization system.

30. The apparatus of embodiment 29 wherein:
the acid gas pre-treatment system;
the regulatory system; and
the ammonia desulfurization system are connected successively along a downstream direction.

31. The apparatus of embodiment 30 wherein the acid gas pre-treatment system includes a sulfur recovery system plus incineration system.

32. The apparatus of embodiment 31 wherein, in the regulatory system, the temperature regulator, humidity regulator and a the sulfur removal device are connected successively in the downstream direction.

33. The apparatus of embodiment 30 wherein, in the regulatory system, the temperature regulator, humidity regulator and a the sulfur removal device are connected successively in the downstream direction.

34. The apparatus of embodiment 1 wherein the ammonia desulfurization system:
is configured to circulate ammonia-containing absorption liquid; and
includes an absorption liquid treatment system that includes:
 a concentration device configured to receive the absorption liquid;
 a solid-liquid separation device configured to collect solids suspended in the liquid; and
 a drying device configured to dry the collected solids.

35. The apparatus of embodiment 34 wherein the absorption liquid treatment system further includes a solution purification device in fluid communication with, and disposed in a direction operationally downstream from, the solid-liquid separation device.

36. The apparatus of embodiment 35 wherein the absorption liquid treatment system further includes an evaporation crystallization device that is:
in fluid communication with:
 the concentration device; and
 the solid-liquid separation device; and
disposed, operationally:
 downstream from the concentration device; and
 upstream from the solid-liquid separation device.

37. The apparatus of embodiment 34 wherein the absorption liquid treatment system further includes an evaporation crystallization device that is:
in fluid communication with:
 the concentration device; and
 the solid-liquid separation device; and
disposed, operationally:
 downstream from the concentration device; and
 upstream from the solid-liquid separation device.

38. The apparatus of any of embodiments 35 to 36 wherein the solution purification device includes an oil removal device that is in fluid communication with the solid-liquid separation device.

39. The apparatus of embodiment 38 wherein the solution purification device includes a suspended matter removal device that is in fluid communication with the solid-liquid separation device.

40. The apparatus of any of embodiments 35 to 36 wherein the solution purification device includes a suspended matter removal device that is in fluid communication with the solid-liquid separation device.

41. The apparatus of any of embodiments 39 to 40 wherein the suspended matter removal device is configured to provide a circulating absorption liquid that has a suspended matter content no greater than 200 mg/L.

42. The apparatus of embodiment 41 wherein the suspended matter content is in the range 20-100 mg/L.

43. The apparatus of embodiment 42 wherein the suspended matter content is in the range 30-50 mg/L.

44. The apparatus of embodiment 38 wherein the oil removal device includes, in fluid communication with the solid-liquid separation device, an air flotation device.

45. The apparatus of embodiment 44 wherein the oil removal device further includes, in fluid communication with the solid-liquid separation device, an adsorption device.

46. The apparatus of embodiment 45 wherein the oil removal device further includes, in fluid communication with the solid-liquid separation device, a precision filtration device.

47. The apparatus of embodiment 38 wherein the oil removal device further includes, in fluid communication with the solid-liquid separation device, an adsorption device.

48. The apparatus of embodiment 38 wherein the oil removal device further includes, in fluid communication with the solid-liquid separation device, a precision filtration device.

49. The apparatus of embodiment 47 wherein the oil removal device further includes, in fluid communication with the solid-liquid separation device, a precision filtration device.

50. The apparatus of embodiment 44 wherein the oil removal device further includes, in fluid communication with the solid-liquid separation device, a precision filtration device.

51. The apparatus of any of embodiments 44 to 50 wherein the oil removal device is configured to produce a circulating absorption liquid having an oil content no greater than 100 mg/L.

52. The apparatus of embodiment 51 wherein the oil content is in the range 10-80 mg/L.

53. The apparatus of embodiment 52 wherein the oil content is in the range 20-30 mg/L.

54. The device of any one of embodiments 44 to 53 wherein the oil removal device is in fluid communication with, and is disposed operationally upstream from, the incineration system.

55. A method for treating acid gas, the method comprising:
receiving acid gas; and
deriving from the acid gas:
 ammonium sulfate; and
 net tail gas that meets a discharge standard.

56. The method of embodiment 55 wherein the discharge standard is defined in the document entitled, "Emission Standard of Pollutants for Petroleum Refining Industry," published as China, GB31570-2015.

57. The method of embodiment 55 wherein the discharge standard is defined in the document entitled, "Emission Standard of Pollutants for Petroleum Chemistry Industry," published as China, GB31571-2015.

58. The method of embodiment 55 wherein the deriving includes:
recovering sulfur from the acid gas to produce sulfur-recovered tail gas; and, then,
incinerating the sulfur-recovered gas.

59. The method of embodiment 55 wherein the deriving includes producing sulfuric acid from the acid gas.

60. The method of embodiment 55 wherein the deriving includes incinerating.

61. The method of any of embodiments 55 to 60 further comprising channeling the acid gas from a petrochemical chemical reaction.

62. The method of any of embodiments 55 to 60 further comprising channeling the acid gas from a natural gas chemical reaction.

63. The method of any of embodiments 55 to 60 further comprising channeling the acid gas from a coal chemical reaction.

64. The method embodiment 55 wherein:
the deriving includes generating catalytic cracking regeneration flue gas; and
the acid tail gas includes the regeneration flue gas.

65. The method of any of embodiments 55 to 64 wherein the deriving comprises adjusting an enthalpy value of acid tail gas.

66. The method of embodiment 55 wherein the deriving includes passing adjusted tail gas through:
a cooling stage,
an absorption stage, and
a water-washing stage,
all in an ammonia circulation desulfurization reactor.

67. The method of embodiment 65 wherein the adjusting includes changing a temperature of the acid tail gas.

68. The method of embodiment 65 wherein the adjusting includes changing a humidity of the acid tail gas.

69. The method of embodiment 68 wherein the adjusting further includes changing a temperature of the acid tail gas.

70. The method of any of embodiments 67 to 69 wherein the adjusting further includes removing sulfur from the acid tail gas.

71. The method of any of embodiments 67 to 69 wherein the adjusting further includes removing dust from the acid tail gas.

72. The method of any of embodiments 67 to 69 wherein the adjusting further includes removing an impurity from the acid tail gas.

73. The method of embodiment 70 wherein the adjusting further includes removing an impurity from the acid tail gas.

74. The method of embodiment 71 wherein the adjusting further includes removing an impurity from the acid tail gas.

75. The method of embodiment 65 wherein the adjusting adjusts the value to 60-850 kJ/kg dry gas.

76. The method of embodiment 75 wherein the adjusting adjusts the value to 80-680 kJ/kg dry gas.

77. The method of embodiment 76 wherein the adjusting adjusts the value to 100-450 kJ/kg dry gas.

78. The method of embodiment 55 wherein the recovering includes flowing the acid gas through a Claus sulfur recovery system having 1 stage.

79. The method of embodiment 55 wherein the recovering includes flowing the acid gas through a Claus sulfur recovery system having 2 stages.

80. The method of embodiment 55 wherein the recovering includes flowing the acid gas through a Claus sulfur recovery system having 3 stages.

81. The method of embodiment 55 wherein the recovering includes flowing the acid gas through a liquid-phase catalytic oxidation sulfur recovery system 82. The method of embodiment 55 wherein the recovering includes flowing the acid gas through a biological sulfur recovery system.

83. The method of any of embodiments 78 to 80 wherein the recovering further includes flowing the acid gas through a SUPERCLAUS sulfur recovery system.

84. The method of any of embodiments 78 to 80 wherein the recovering further includes flowing the acid gas through a EUROCLAUS sulfur recovery system.

85. The method of any of embodiments 78 to 80 wherein the recovering further includes flowing the acid gas through a biological sulfur recovery system.

86. The method of any of embodiments 78 to 80 wherein the recovering further includes flowing the acid gas through a liquid-phase catalytic oxidation sulfur recovery system.

87. The method of embodiment 59 wherein the sulfuric acid production includes wet sulfuric acid production.

88. The method of embodiment 59 wherein the sulfuric acid production includes dry sulfuric acid production.

89. The method of any of embodiments 78 to 88 wherein the recovering includes producing sulfur-recovered gas having a molar ratio $H_2S/SO_2$ in the range 1.2-3.

90. The method of embodiment 89 wherein the molar ratio is in the range 1.5-2.5.

91. The method of embodiment 56 wherein the incinerating:
is performed at a temperature in the range 600° C.-1,300° C.; and
produces an acid tail gas.

92. The method of embodiment 91 wherein, in the incinerating, the sulfur-recovered tail gas has a residence time in the range 1 to 6 s.

93. The method of any of embodiments 91 to 92 wherein the acid tail gas has an oxygen content in the range 2%-5%.

94. The method of any of embodiments 91 to 93 wherein the acid tail gas has a sulfur oxide content in the range 2,000 mg/Nm$^3$ to 150,000 mg/Nm$^3$.

95. The method of any of embodiments 91 to 94 wherein the incinerating is performed at a temperature in the range 650° C. to 950° C.

96. The method of any of embodiments 91 to 95 wherein, in the incinerating, the sulfur-recovered tail gas has a residence time in the range 1.5 to 4 s.

97. The method of any of embodiments 91 to 96 wherein the acid tail gas has an oxygen content in the range 3%-4%.

98. The method of any of embodiments 91 to 97 wherein the acid tail gas has a sulfur oxide content in the range 5,000 mg/Nm$^3$ to 55,000 mg/Nm$^3$.

99. The method of embodiment 56 further comprising producing an acid tail gas having a sulfur oxide content in the range 2,000 mg/Nm$^3$ to 150,000 mg/Nm$^3$.

100. The method of embodiment 99 wherein the incinerating:
is performed at a temperature in the range 600° C.-1,300° C.; and
produces the acid tail gas.
101. The method of any of embodiments 99 to 100 further comprising incinerating sulfur-recovered tail gas having an incineration residence time in the range 1 to 6 s.
102. The method of any of embodiments 99 to 101 wherein the acid tail gas has an oxygen content in the range 2%-5%.
103. The method of any of embodiments 99 to 102 wherein the incinerating is performed at a temperature in the range 650° C. to 950° C.
104. The method of any of embodiments 99 to 103 wherein, in the incinerating, the sulfur-recovered tail gas has a residence time in the range 1.5 to 4 s.
105. The method of any of embodiments 99 to 104 wherein the acid tail gas has an oxygen content in the range 3%-4%.
106. The method of any of embodiments 99 to 105 wherein the acid tail gas has a sulfur oxide content in the range 5,000 mg/Nm$^3$ to 55,000 mg/Nm$^3$.
107. The method of embodiment 56 further comprising producing an acid tail gas having an oxygen content in the range 2%-5%.
108. The method of embodiment 107 wherein the acid tail gas has a sulfur oxide content in the range 2,000 mg/Nm$^3$ to 150,000 mg/Nm$^3$.
109. The method of any of embodiments 107 to 108 wherein the incinerating:
is performed at a temperature in the range 600° C.-1,300° C.; and
produces the acid tail gas.
110. The method of any of embodiments 107 to 109 wherein, in the incinerating, the sulfur-recovered tail gas has a residence time in the range 1 to 6 s.
111. The method of any of embodiments 107 to 110 wherein the incinerating is performed at a temperature in the range 650° C. to 950° C.
112. The method of any of embodiments 107 to 111 wherein, in the incinerating, the sulfur-recovered tail gas has a residence time in the range 1.5 to 4 s.
113. The method of any of embodiments 107 to 112 wherein the acid tail gas has an oxygen content in the range 3%-4%.
114. The method of any of embodiments 107 to 113 wherein the acid tail gas has a sulfur oxide content in the range 5,000 mg/Nm$^3$ to 55,000 mg/Nm$^3$.
115. The method of embodiment 56 wherein, in the incinerating, the sulfur-recovered tail gas has a residence time in the range 1 to 6 s.
116. The method of any of embodiment 115 further comprising producing acid tail gas having an oxygen content in the range 2%-5%.
117. The method of any of embodiments 115 to 116 further comprising producing acid tail having a sulfur oxide content in the range 2,000 mg/Nm$^3$ to 150,000 mg/Nm$^3$.
118. The method of any of embodiments 115 to 117 wherein the incinerating:
is performed at a temperature in the range 600° C.-1,300° C.; and
produces an acid tail gas.
119. The method of any of embodiments 115 to 118 wherein the incinerating is performed at a temperature in the range 650° C. to 950° C.
120. The method of any of embodiments 115 to 119 wherein, in the incinerating, the sulfur-recovered tail gas has a residence time in the range 1.5 to 4 s.
121. The method of any of embodiments 115 to 120 wherein the acid tail gas has an oxygen content in the range 3%-4%.
122. The method of any of embodiments 115 to 121 wherein the acid tail gas has a sulfur oxide content in the range 5,000 mg/Nm$^3$ to 55,000 mg/Nm$^3$.
123. The method of embodiment 55 wherein the deriving includes reducing a suspended matter content of an ammonia desulfurization circulating absorption liquid to no greater than 200 mg/L.
124. The method of embodiment 123 wherein the deriving further includes reducing an oil content of an ammonia desulfurization circulating absorption liquid to no greater than 100 mg/L.
125. The method of embodiment 55 wherein the deriving includes reducing an oil content of an ammonia desulfurization circulating absorption liquid to no greater than 100 mg/L.
126. The method of 67 wherein the adjusting produces adjusted tail gas having an organic matter content not greater than 30 ppm.
127. The method of 67 wherein the adjusting produces adjusted tail gas having an elementary sulfur and hydrogen sulfide content not greater than 30 ppm.
128. The method of any of embodiments 126 to 127 wherein the adjusting produces adjusted tail gas having an organic matter content not greater than 10 ppm.
129. The method of any of embodiments 126 to 128 wherein the adjusting produces adjusted tail gas having an elementary sulfur and hydrogen sulfide content not greater than 10 ppm.
130. The method of 68 wherein the adjusting produces adjusted tail gas having an elementary sulfur and hydrogen sulfide content not greater than 30 ppm.
131. The method of 68 wherein the adjusting produces adjusted tail gas having an organic matter content not greater than 30 ppm.
132. The method of any of embodiments 130 to 131 wherein the adjusting produces adjusted tail gas having an organic matter content not greater than 10 ppm.
133. The method of any of embodiments 130 to 132 wherein the adjusting produces adjusted tail gas having an elementary sulfur and hydrogen sulfide content not greater than 10 ppm.
134. The method of any one of the preceding embodiments wherein the specific process steps include:
a) acid gas is treated by sulfur recovery plus incineration or sulfuric acid production or incineration, or directly by catalytic cracking catalyst regeneration process to obtain acid tail gas;
b) the acid tail gas is fed into the regulatory system to adjust the enthalpy value of the tail gas to be within the range of 60-850 kJ/kg dry gas, for example 80-680 kJ/kg dry gas or 100-450 kJ/kg dry gas;
c) the acid tail gas which meets the enthalpy value requirement is fed into the ammonia desulfurization process for treatment, to achieve the purpose that net tail gas meets the discharge standard through multi-stage circulating absorption.

Thus, apparatus and methods for treating acid gas have been provided. Persons skilled in the art will appreciate that the present invention can be practiced by other than the described examples, which are presented for purposes of illustration rather than of limitation. The present invention is limited only by the claims that follow.

What is claimed is:

1. Apparatus for treating acid gas, the apparatus comprising:
   an acid gas pre-treatment system;
   in fluid communication with the acid gas pre-treatment system, an ammonia desulfurization system; and,
   in fluid communication with the ammonia desulfurization system, an impurity removal apparatus that includes a catalytic oxidation apparatus.

2. The apparatus of claim 1 wherein the ammonia desulfurization system includes an activated carbon adsorption apparatus.

3. The apparatus of claim 1 wherein the ammonia desulfurization system includes an evaporation crystallization apparatus.

4. The apparatus of claim 1 wherein the ammonia desulfurization system includes a solution purification apparatus.

5. The apparatus of claim 1 wherein the ammonia desulfurization system:
   is configured to circulate ammonia-containing absorption liquid; and
   includes an absorption liquid treatment system that includes:
      a concentration device configured to receive the absorption liquid;
      a solid-liquid separation device configured to collect solids suspended in the liquid; and
      a drying device configured to dry the collected solids.

6. The apparatus of claim 1 wherein the impurity removal apparatus is configured to reduce organic content of the gas.

7. Apparatus for treating acid gas, the apparatus comprising:
   an acid gas pre-treatment system;
   in fluid communication with the acid gas pre-treatment system, an ammonia desulfurization system; and,
   in fluid communication with the ammonia desulfurization system:
      an impurity removal apparatus that includes a catalytic oxidation apparatus; and
      a dust removal apparatus.

8. The apparatus of claim 7 further comprising a regulatory system that is in fluid communication with the ammonia desulfurization system.

9. The apparatus of claim 8 wherein the regulatory system includes a temperature regulator configured to regulate a gas temperature in the regulatory system.

10. The apparatus of claim 8 wherein the regulatory system includes a humidity regulator configured to regulate a gas humidity in the regulatory system.

11. Apparatus for treating acid gas, the apparatus comprising:
    an acid gas pre-treatment system, the acid gas pre-treatment system including a sulfur recovery system plus incineration system;
    in fluid communication with the acid gas pre-treatment system, an ammonia desulfurization system; and,
    in fluid communication with the ammonia desulfurization system, an impurity removal apparatus that includes a catalytic oxidation apparatus.

12. The apparatus of claim 11 wherein the ammonia desulfurization system:
    is configured to circulate ammonia-containing absorption liquid; and
    includes an absorption liquid treatment system that includes:
       a concentration device configured to receive the absorption liquid;
       a solid-liquid separation device configured to collect solids suspended in the liquid; and
       a drying device configured to dry the collected solids.

13. The apparatus of claim 11 further comprising a sulfur removal device that is in fluid communication with the ammonia desulfurization system.

14. The apparatus of claim 11 wherein the impurity removal apparatus is configured to reduce organic content of the gas.

15. The apparatus of claim 11 further comprising a regulatory system that is in fluid communication with the ammonia desulfurization system.

16. The apparatus of claim 15 wherein the regulatory system includes a humidity regulator configured to regulate a gas humidity in the regulatory system.

17. The apparatus of claim 15 wherein the regulatory system is disposed downstream, relative to direction of process flow of the acid gas in the apparatus, from the acid gas pre-treatment system.

18. The apparatus of claim 15 wherein the regulatory system is disposed upstream, relative to direction of process flow of the acid gas in the apparatus, from the acid gas pre-treatment system.

19. The apparatus of claim 15 wherein the regulatory system includes a temperature regulator configured to regulate a gas temperature in the regulatory system.

20. The apparatus of claim 19 wherein the regulatory system further includes a humidity regulator configured to regulate a gas humidity in the regulatory system.

21. The apparatus of claim 20 wherein, in the regulatory system, the temperature regulator, humidity regulator and a sulfur removal device are connected successively in the downstream direction relative to direction of process flow of the acid gas in the apparatus.

* * * * *

UNITED STATES PATENT AND TRADEMARK OFFICE
CERTIFICATE OF CORRECTION

PATENT NO. : 10,953,365 B2
APPLICATION NO. : 16/740917
DATED : March 23, 2021
INVENTOR(S) : Jing Luo et al.

Page 1 of 1

It is certified that error appears in the above-identified patent and that said Letters Patent is hereby corrected as shown below:

In the Specification
At Column 5, Line 54:
Please replace --- or SO" ---
With --- or SOx" ---

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*